(12) United States Patent
Melcher

(10) Patent No.: US 7,931,286 B2
(45) Date of Patent: Apr. 26, 2011

(54) VEHICLE LEAN AND ALIGNMENT CONTROL SYSTEM

(76) Inventor: Thomas W. Melcher, Mesa, AZ (US)

( * ) Notice: Subject to any disclaimer, the term of this patent is extended or adjusted under 35 U.S.C. 154(b) by 667 days.

(21) Appl. No.: 10/577,692

(22) PCT Filed: Oct. 27, 2004

(86) PCT No.: PCT/US2004/036107
§ 371 (c)(1),
(2), (4) Date: Jul. 7, 2008

(87) PCT Pub. No.: WO2005/051712
PCT Pub. Date: Jun. 9, 2005

(65) Prior Publication Data
US 2008/0258415 A1  Oct. 23, 2008

Related U.S. Application Data

(63) Continuation-in-part of application No. 10/695,377, filed on Oct. 27, 2003, now Pat. No. 7,131,650, which is a continuation-in-part of application No. 10/428,274, filed on May 2, 2003, now Pat. No. 6,805,362.

(60) Provisional application No. 60/555,425, filed on Mar. 22, 2004.

(51) Int. Cl.
*B60G 21/00*  (2006.01)

(52) U.S. Cl. ........... 280/124.103; 280/5.508; 280/5.509; 280/5.52; 280/5.521; 280/5.522

(58) Field of Classification Search ........... 280/124.103, 280/5.52, 5.521, 5.522, 5.5, 5.504, 5.508, 280/5.509, 5.51, 5.512, 5.517, 5.518
See application file for complete search history.

(56) References Cited

U.S. PATENT DOCUMENTS

| 3,652,104 A | 3/1972 | Chabek |
| 4,546,997 A | 10/1985 | Smyers |
| 4,700,972 A | 10/1987 | Young |
| 4,826,206 A | 5/1989 | Immega |
| 4,927,169 A | 5/1990 | Scaduto |
| 5,324,056 A | 6/1994 | Orton |
| 5,435,193 A | 7/1995 | Halliday |

(Continued)

FOREIGN PATENT DOCUMENTS

DE  10007658 A1  10/2001

(Continued)

*Primary Examiner* — Eric Culbreth
(74) *Attorney, Agent, or Firm* — Robert D. Atkins; Patent Law Group

(57) ABSTRACT

A frame and suspension for a vehicle provides automatic lean and alignment. The lean is determined by force sensors, the speed and/or the angle of turn and is provided by actuators in the suspension in accordance with a predetermined protocol in an electronic control unit (ECU). The protocol also provides shock absorption by rapidly tracking a contour of a surface on which the vehicle rides. The suspension is provided by a plurality of arm assemblies each including a lower arm, an upper control arm, and an actuator motively connected to the lower arm and to the upper control arm. The arm assemblies are pivotally connected to the frame on a common axis. The arm assemblies generally form parallelograms and are actuated in concert to remain generally parallel to each other through a range of angles to adjust the lean of the vehicle. The arm assemblies are also actuated independently of each other to accommodate variations in the contour. In one aspect, an actuator controlled by an ECU can be replaced by a mechanical actuator that can be activated manually such as by a driver's own leaning weight.

22 Claims, 21 Drawing Sheets

U.S. PATENT DOCUMENTS

| | | |
|---|---|---|
| 5,580,089 A | 12/1996 | Kolka |
| 6,267,387 B1 | 7/2001 | Weiss |
| 6,279,920 B1 | 8/2001 | Choudhery |
| 6,406,036 B1 | 6/2002 | Laurent et al. |

FOREIGN PATENT DOCUMENTS

| | | |
|---|---|---|
| FR | 2121813 | 8/1972 |
| GB | 2155410 A | 9/1985 |
| JP | 01311907 | 12/1989 |
| JP | 03279010 | 12/1991 |
| JP | 05085133 | 6/1993 |
| JP | 06064438 | 3/1994 |
| JP | 01311907 | 6/1998 |
| WO | 95/15865 | 6/1995 |
| WO | 9515865 | 6/1995 |
| WO | 9637375 | 11/1996 |
| WO | 9849023 | 11/1998 |
| WO | 00/38939 | 7/2000 |
| WO | 0038939 | 7/2000 |
| WO | 02058949 A1 | 8/2002 |
| WO | 2004098916 A1 | 11/2004 |

VEHICLE LEAN AND ALIGNMENT CONTROL SYSTEM

This application is a continuation-in-part of U.S. patent application Ser. No. 10/695,377, filed Oct. 27, 2003 now U.S. Pat. No. 7,131,650, which is a continuation-in-part of U.S. patent application Ser. No. 10/428,274, filed May 2, 2003, and issued as U.S. Pat. No. 6,805,362 on Oct. 19, 2004. Each of these applications is entitled "VEHICLE LEAN AND ALIGNMENT CONTROL SYSTEM", is incorporated herein by reference, and is by the same inventor, Thomas Wesley Melcher. This application also claims the priority benefit of U.S. provisional patent application Ser. No. 60/555,425 filed Mar. 22, 2004 and entitled "VEHICLE LEAN AND ALIGNMENT CONTROL SYSTEM, SUSPENSIONS, ACTUATORS THEREFORE, AND VEHICLES INCORPORATING THE SAME", the disclosure of which is incorporated herein by reference.

BACKGROUND OF THE INVENTION

This invention generally relates to vehicles that are capable of being leaned and that have rear steering capabilities, and more specifically to a frame and suspension system that facilitates leaning and rear steering on a vehicle having more than two wheels.

Vehicles capable of leaning include motorcycles. Of course, standard configuration motorcycles have only two wheels so that leaning the vehicle happens naturally. The benefits of leaning include that leaning facilitates turning. Leaning the motorcycle in a direction while the motorcycle is moving forward actually pulls the front steering in the same direction.

Another benefit of leaning the motorcycle is that the wheels are also leaned and better support the forces applied to the wheel and tire. At the same time, leaning increases the contact area of the tire on a driving surface. Still further, leaning the motorcycle better positions the center of gravity on the line of force applied to the surface by the motorcycle and driver.

Rear wheel alignment by a rear steering mechanism has been implemented on vehicles having four wheels, such as automobiles. Rear steering mechanisms have been provided for counter steering the rear wheels for greater maneuverability. These counter steering mechanisms are generally restricted to operation at low speeds.

SUMMARY OF THE INVENTION

The present invention relates to a vehicle that includes many of the advantages of a motorcycle on a vehicle having three or more wheels. With the frame and suspensions of the present invention, the same advantages of leaning the wheels and the frame of the vehicle supported on the frame are provided. With each additional wheel over two, an additional adhesion point is provided. Thus, a vehicle with four wheels will have twice as many adhesion points as a standard motorcycle. As such, the vehicle will enable faster stopping. Also, the vehicle can automatically lower the frame and provide a lower center of gravity of the vehicle during deceleration. One way of carrying this out is to automatically cause the rear suspension to mirror the front suspension during braking. Furthermore, it is contemplated that approximately a thirty percent increase in speed around corners may be achieved with the present invention. This is due, in part, to the increased adhesion patch at each of the adhesion points when the wheels are leaned during turning. Still further, with the frame leaning into turns, the centrifugal and gravitational forces are more evenly distributed among the adhesion points. The vehicle can include additional advantages of automatically leaning the frame and wheels and aligning the rear wheels. Aligning the rear wheels reduces drag that typically occurs during turns, and thus improves gas mileage or efficiency in general.

Another advantage provided by the frame and suspension of the present invention is that they include shock absorption by way of shock absorbers and an electromechanical tracking mechanism. The term "shock absorbers" as used throughout this disclosure can include a spring coiled over a shock absorption device, a torsion bar, or an air shock for example. In any case, it is to be understood that "shock absorber" as used herein refers to a mechanism having support characteristics capable of supporting the chassis and body weight of a vehicle and having shock absorbing characteristics. The shock absorption of the frame and suspension can be in addition to shock absorbers on a vehicle body, such as on a motorcycle body. That is, the motorcycle body with its front and rear shocks can be supported on the frame and suspension of the present invention. As can be appreciated this offers redundancy and provides an exceedingly smooth ride. The stiffness of the various shock absorbers and tracking mechanism can be varied to absorb a variety of shock and vibrations.

The shock absorbers of the frame and suspension system of the present invention are mounted as close to a central longitudinal axis as possible. This location together with the structural relationship of the shock absorbers to the frame and suspension provides the advantage of increased mechanical advantage for forces applied to the wheels, the frame, vehicle body, and the driver/rider(s) with increased lean.

The change in position of the shock absorber(s) relative to the lower arm helps reduce the transfer of force to the other side of the frame. Furthermore, the present suspension includes an arm assembly for each wheel that it supports. Each arm assembly can be deflected independently so that the load is minimally transferred to the other side of the frame.

The lean can be effectuated automatically with an electronic control unit (ECU). This enables the system to automatically select the amount of lean based on the speed and angle of turn of the vehicle. Alternatively or additionally, the angle of lean can be determined and automatically adjusted based on feedback from one or more force sensors that are positioned to detect a distribution of gravitational and centrifugal forces. Likewise, the angle of turn of the rear wheels can be automatically adjusted by the ECU. Thus cornering can be significantly aided and the protocol in the ECU can be configured and/or adjusted to place these automatic features at their maximum with a selected safety factor. Alternatively, the ECU can be replaced by other processors including mechanical processors. Such mechanical processors could employ a variety of springs including air springs, and could include compressible and non-compressible fluids to coordinate movement between arm assemblies. Further alternatively, the lean could be effected through a set of gears or a force multiplying device such as a fluid piston, or rack and pinion mechanism. Still further, part of the system could be automatic and the rest of the system could be manually controlled by the vehicle driver. In this case, the driver replaces the portion of the processor that would otherwise automatically control at least some of the function of the frame and suspension system. For example, the frame and suspension system could be configured to automatically track a contour of the driving surface for improved shock absorption, while requiring the driver to determine the amount of lean by shifting his or her body weight, as with a standard motorcycle. In this case, the frame and suspension could normally hold the vehicle in an upright position when no substantial leaning force is applied, and lean can depend on the sensory perception and control of the driver.

In a simple form in which the invention is implemented without an ECU, a vehicle having a substantially mechanically controlled suspension is provided. As with the above described aspects, the substantially mechanical version provides a vehicle having a suspension with a lean and alignment control system. The system includes a frame having a central longitudinal axis and an upright axis that is generally perpendicular to a surface on which the vehicle rests when the frame is in a neutral position with no net leaning loads applied. The system also has a suspension including a plurality of arm assemblies connected to the frame. The system further has a mechanical feedback mechanism forming an interconnection between the frame and the suspension. Each arm assembly includes a lower arm with an inboard end and an outboard end, an upper control arm having an inboard end and an outboard end, and an actuator mounted to the lower arm and motively connected to the upper control arm.

In the mechanically controlled system, the actuator further includes an actuator arm pivotally connected to the inboard end of the upper control arm. The actuator arm is connected pivotally to the inboard end of the lower arm. A mechanical drive mechanism is motively connected to the actuator arm to move the actuator arm through a range of motion.

In one aspect, the mechanical drive mechanism includes an actuation cylinder in fluid communication with a fluid driven rack and pinion. The fluid driven rack and pinion is drivingly connected to the actuator. In this aspect, the actuation cylinder is fluidly connected to the fluid driven rack and pinion by a high pressure fluid line containing a substantially noncompressible fluid. A fluid reservoir is disposed in the high pressure fluid line for receiving excess fluid during periods of high flow rate. Advantageously, the reservoir is expansible and has a spring for adjusting expansibility. Thus, the fluid system can be adjusted to take up excess fluid under conditions of greater or lesser fluid flow that may be generally proportional to the forces applied by bumps in the contour of the driving surface. Also in this aspect, the present invention includes a pressure control valve in the high pressure fluid line for adjusting a flow aperture through which the fluid flows and for providing a safety pop off valve. In this fluid driven aspect of the invention, the actuation cylinder may be fluidly connected to a first side of the fluid driven rack and pinion by the high pressure fluid line, and the actuation cylinder may also be fluidly connected to a second side of the fluid driven rack and pinion by a low pressure fluid line. It is to be understood that fluid connections on both sides may comprise the non-compressible fluid. Alternatively, one side of the system may have a gas in place of the non-compressible fluid.

As in the other aspects, the mechanically controlled system can include a plurality of like arm assemblies. In this case, the mechanical feedback mechanism is a first mechanical feedback mechanism. The vehicle further has a plurality of similar feedback mechanisms operatively associated with respective arm assemblies.

In one aspect, the mechanical feedback mechanisms comprise respective position indicating cams operably associated with the respective arm assemblies for automatically controlling the mechanical drive mechanism and the actuator arm in each arm assembly. With regard to this aspect, the plurality of arm assemblies includes at least a first arm assembly on a first side of the frame and a second arm assembly on a second side opposite to the first side. The mechanical feedback mechanisms automatically move the first arm assembly through a first lean angle closer to the frame and the second arm assembly away from the frame so that the first and second arm assemblies remain generally parallel to each other in response to a leaning force applied by a rider of the vehicle.

In an exemplary basic form, a vehicle with a lean and alignment control system in accordance with the present invention includes a frame having a central longitudinal axis. The frame also has an upright axis that is adapted to be generally perpendicular to a surface on which the vehicle rests when the frame is in a neutral position with no net leaning loads applied. A vehicle body is supported on the frame. A suspension comprising a plurality of arm assemblies is connected to the frame. Each arm assembly includes a lower arm having an inboard end and an outboard end, an upper control arm having an inboard end and an outboard end, and an actuator mounted to the lower arm and motively connected to the upper control arm. Many variations are possible without departing from the spirit and scope of the invention. Some of these variations will become apparent in the detailed description below. It is to be understood that while many aspects of the invention are described herein with regard to a vehicle, the invention also encompasses the frame and suspension system by itself. Likewise, the invention encompasses the suspension system and the individual arm assemblies that make up the suspension.

The present invention in one aspect includes a method of properly leaning and aligning a vehicle supported on a suspension. This method has several basic steps including automatically leaning a frame of the vehicle at a predetermined angle relative to an arm of one of a plurality of arms assemblies. Automatically leaning the frame can further include providing a protocol in a processor to control the lean. Data is then automatically fed from a vehicle speed sensor and a steering position sensor to the processor. The frame is automatically moved relative to the arm according to the protocol under processor control.

In another aspect, the present invention includes a method of tracking a contour of a driving surface to absorb shock. The method includes automatically and independently raising and lowering a plurality of arms of a vehicle suspension to accommodate variations in the contour. In order to do this, the system provides feed forward by a mechanical shock absorber. Then the step of raising and lowering the plurality of arms is accomplished by providing feedback to a processor; which raises and lowers the arms under processor control.

The automatic and tracking aspects of the method described above are particularly applicable to the method implemented with and controlled by an ECU. However, many of the same steps are also provided in the method as it applies to the mechanically controlled and aligned system. For example in one aspect, a method of tracking a contour of a driving surface to absorb shock includes automatically and independently raising and lowering a plurality of arms of the vehicle suspension to accommodate variations in the contour by a mechanical mechanism. Like the aspects described above, this method includes providing feed forward by at least one mechanical shock absorber. Another step is providing feedback via the mechanical mechanism to an actuator. The method also includes raising and lowering the arms by the actuator according to the feedback.

In a simple form, the present invention may be a frame and suspension for a vehicle and may include a frame, a lower arm having an inboard end coupled to the frame and an outboard end, an upper control arm having an inboard end and an outboard end, an actuator comprising a drive mechanism and at least one actuator arm. The actuator arm may be pivotally connected to the lower arm and the upper control arm. The drive mechanism may be connected to the actuator arm.

The frame and suspension may also include a cammed cylinder having a piston in fluid communication with an actuation mechanism that at least partially controls the actuator arm. Thus, the actuator may be motively connected to at least one of the lower arm and the upper control arm by the actuator arm. The actuation mechanism may include a mechanical shock absorber and the actuator line may connect the cammed cylinder to the mechanical shock absorber.

In a simple form, the frame and suspension may include a mechanical shock absorber pivotally connected to the actuator arm. The mechanical shock absorber may be pivotally connected to the frame. The frame and suspension may further include a cam member supported on the lower arm and a cammed cylinder having a piston motively coupled to the cam member. An actuator line may connect the cammed cylinder to the mechanical shock absorber.

The frame and suspension may further include a mechanical link pivotally connected to the actuator arm. The mechanical link may be pivotally connected to the frame. A hub assembly may be pivotally connected to the outboard ends of the lower arm and the upper control arm. The pivotal connections of the actuator arm, the lower arm, the upper control arm, and the hub assembly generally form a first parallelogram. The pivotal connections between the mechanical link, the frame, the actuator arm, and the lower arm may form a second parallelogram.

In another simple form, the frame and suspension may include an actuator pump coupled to an actuator feed line. The actuator may be a cylinder having a piston motively coupled to the actuator feed line. One of the cylinder and the piston may be supported on one of the lower arm and the upper control arm. The other of the piston and the cylinder is motively connected to the actuator arm.

In any case, the frame may be a vehicle frame. The suspension may include the lower arm, the upper control arm, the actuator arm, and the actuator as a first arm assembly. The suspension may further include at least a second arm assembly similar to the first arm assembly. In this case, each arm assembly may include a cammed cylinder fluidly connected to at least one mechanical shock absorber. It is to be understood that the cammed cylinders may have pistons that move therein to provide a greater or lesser effective volume for each shock absorber. The effective volume in the shock absorber may be decreased as the respective arm assembly is rotated through an arc toward the frame. On the other hand, the effective volume in the shock absorber may be decreased as the respective arm assembly is rotated through an arc away from the frame.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a vehicle, and a frame and a suspension system for the vehicle.

Figure 1A:
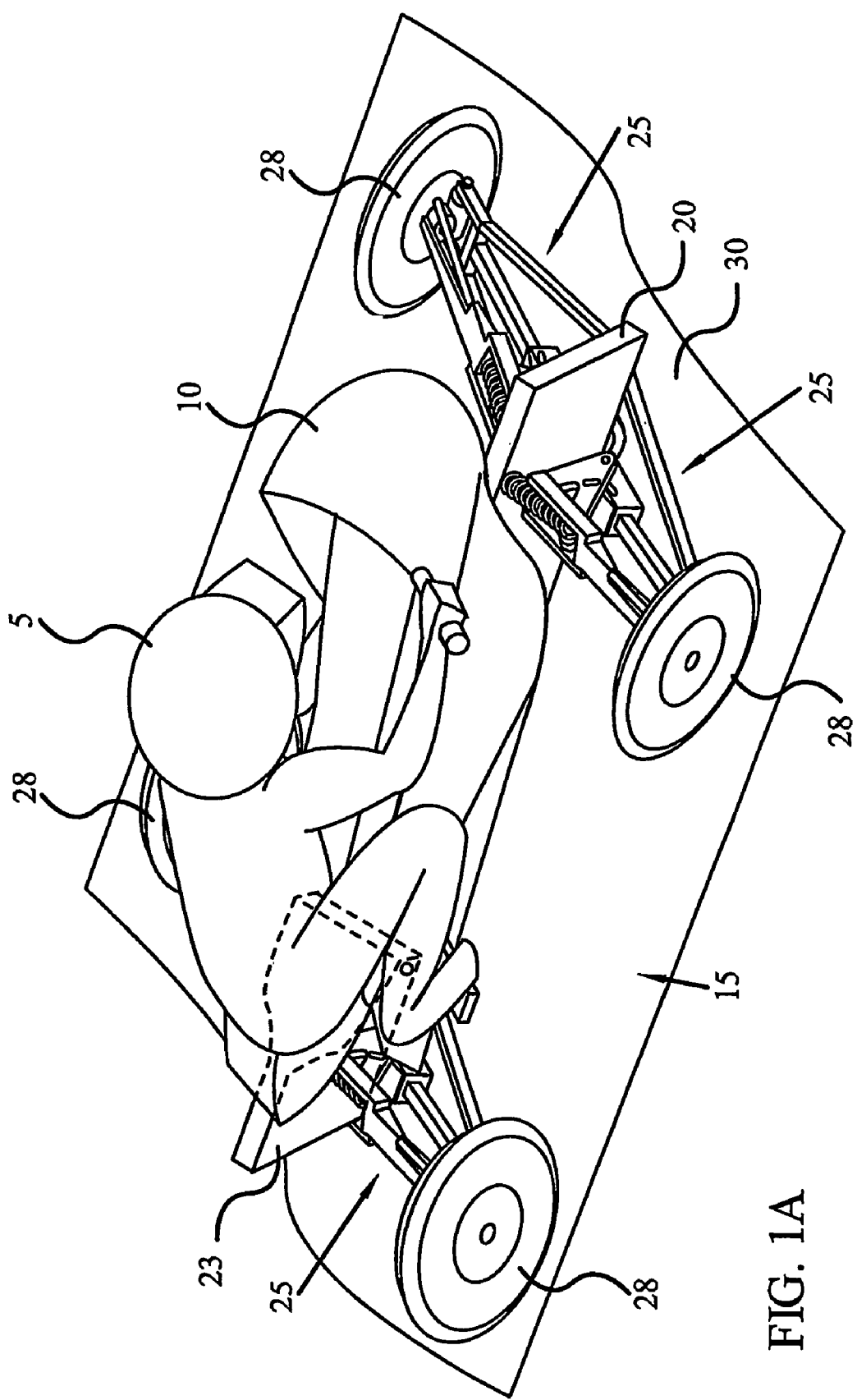
FIG. 1A is a perspective view of a vehicle incorporating frames and suspensions according to an embodiment of the present invention.

As shown in FIG. 1A, a driver 5 is seated on a vehicle 10 that is supported on a frame and suspension system 15 in accordance with the present invention. In the example of FIG. 1, the frame and suspension system includes a front frame 20 and a swing arm frame 23. Each of frames 20 and 23 has separate suspensions in the form of arm assemblies 25. Each arm assembly 25 is independently and pivotally connected to the frames 20, 23. The arm assemblies 25 support wheels 28 at outboard ends. The wheels 28, of course, support the frame and suspension system 15 and the vehicle 10 on a driving surface 30.

Figure 1B:
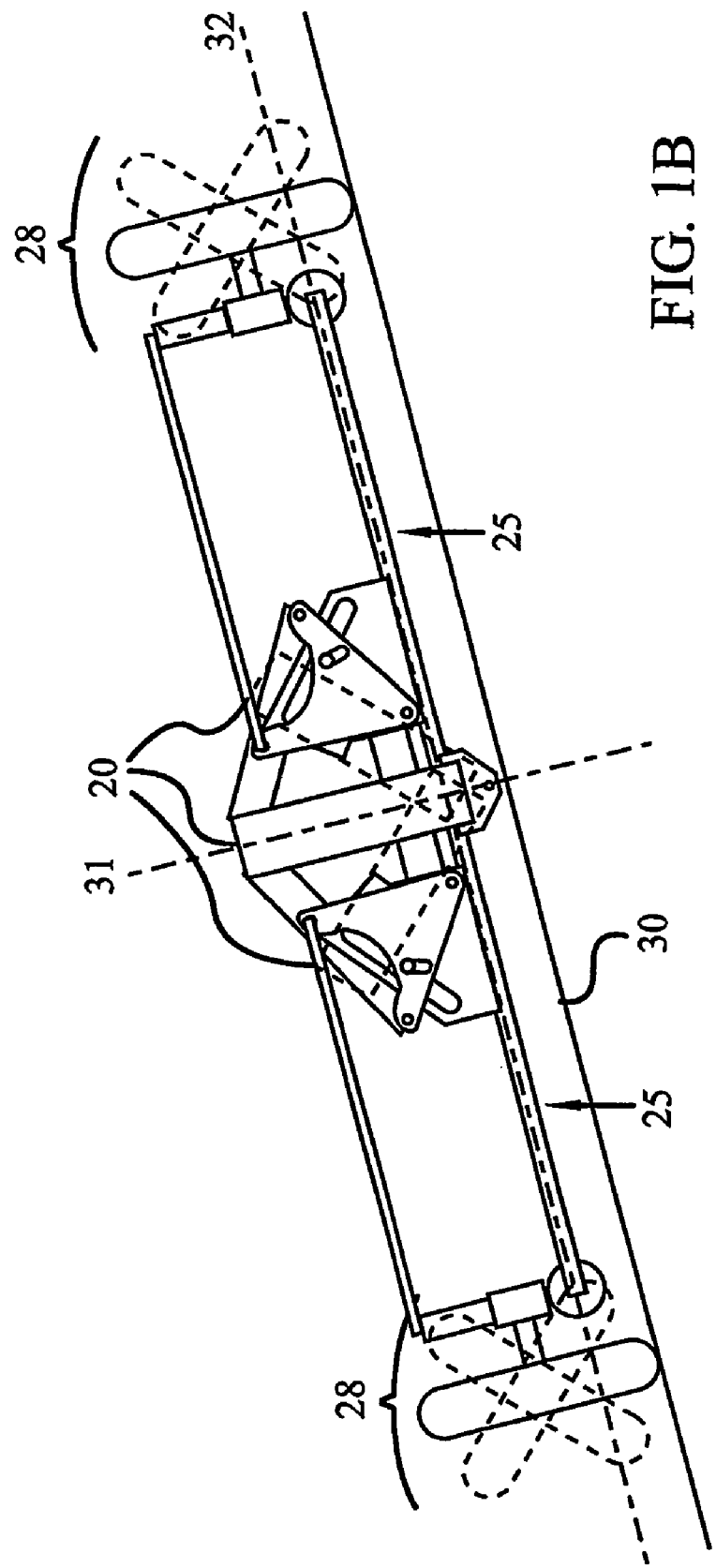
FIG. 1B is a diagrammatic end view of the frame and suspension of FIG. 1 showing a variety of lean positions of the frame and wheels.

As can be appreciated from the diagrammatic end view of FIG. 1B, the arm assemblies 25 permit the frames 20, 23 to lean through a range of angles relative to a plane 31 that is upright and substantially perpendicular to a plane 32 defined by the arm assemblies in a neutral position with no net leaning forces thereon. The arm assemblies 25 have structural details to be further described below that generally form parallelograms and thereby lean the wheels 28 generally at the same angle to the arm assembly plane 32 as the frame 20, 23 is to the arm assembly plane 32. This is the case, at least, when the surface 30 is reasonably smooth so as not to raise or lower any of the arm assemblies out of the plane 32. Thus, it can be seen that in cornering applications, the wheels 28 and the frames 20, 23 will be substantially parallel to each other. The frames 20, 23 will generally shift a center of gravity to better balance the centrifugal forces. Both the wheels 28 and the frames 20,23 will be oriented to provide a stronger support for the centrifugal and gravitational forces that will be applied.

Figure 2A:
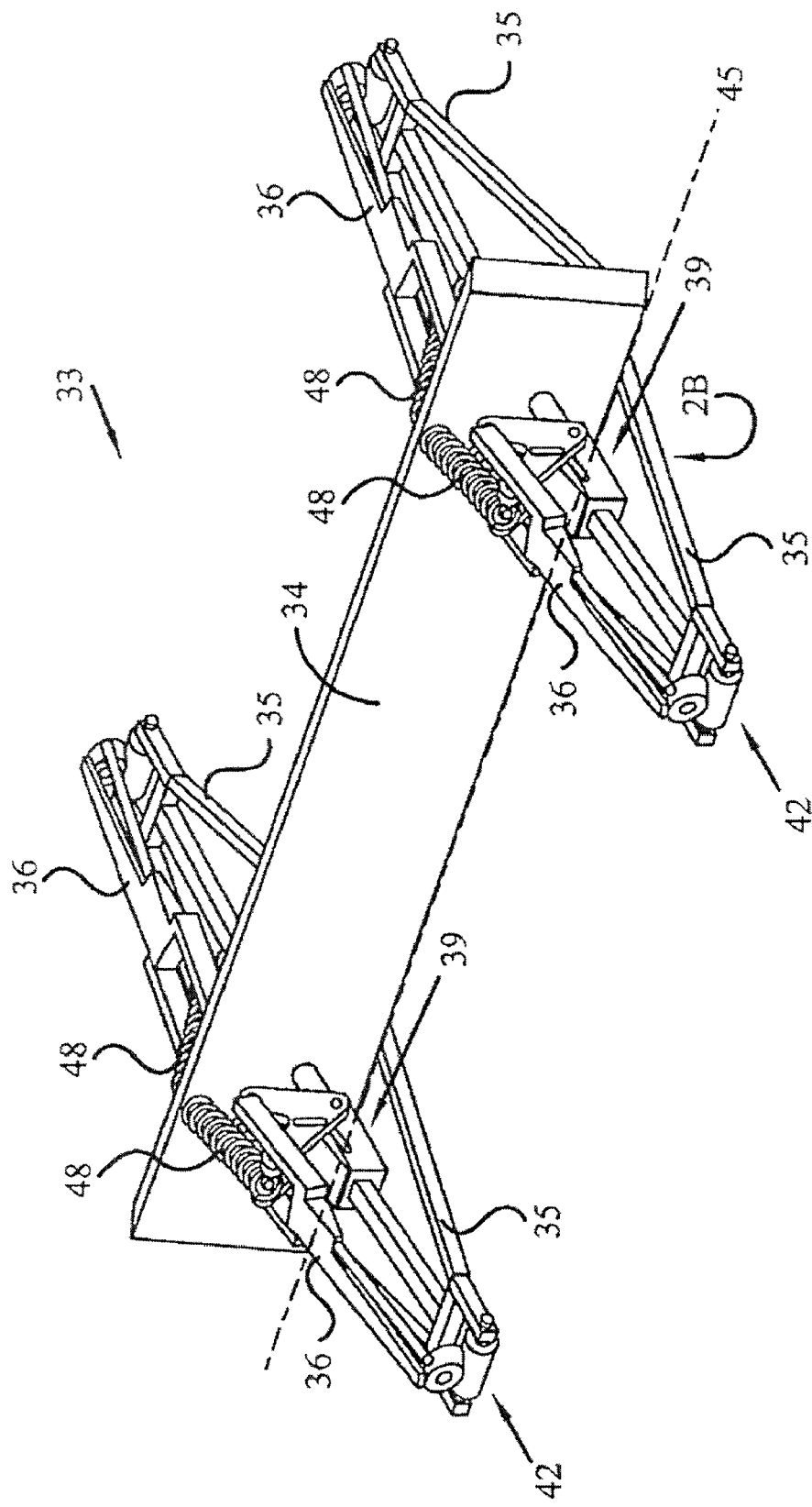
FIG. 2A is a perspective view of a frame and suspension showing the frame in a leaned position.

FIG. 2A is a perspective view of a frame and suspension system 33 with a frame 34 similar to frame 20, but having a length sufficient to support a whole vehicle. This particular configuration lends itself to supporting a bicycle, such as a recumbent bicycle. However, combination with any vehicle, motorized or not, whether existing or not yet designed, is within the spirit and scope of the invention. Likewise, frames of any configuration can be substituted for the frames 20, 23, and 34 as long as the substituted frames provide similar mountings to the exemplary embodiments described herein. Frame 34 can be leaned toward at least one arm assembly 25 and away from the other arm assembly 25 on an opposite side of the frame 34.

In the position shown in FIG. 2A, a parallelogram effect becomes apparent. That is, each arm assembly 25 has a lower arm 35, an upper control arm 36, an actuator 39 connecting inboard end of the upper control arm 36, and a hub assembly 42 connecting the outboard ends of the lower arm 35 and the upper control arm 36. Each of the lower arm 35, upper control arm 36, actuator 39, and hub assembly 42 are pivotally connected to each other. All of the arm assemblies 25 are pivotally connected to the frame 34 on a common pivot axis 45. In this way a height mismatch in points of connection is avoided when the frame 34 is leaned. However, it is possible to mount the arm assemblies on laterally outward edges of a wider frame without departing from the scope of the invention. The arm assemblies are also connected to the frame 34 by shock absorbers 48. The shock absorbers permit damped movement as will be described in further detail below.

Figure 2B:
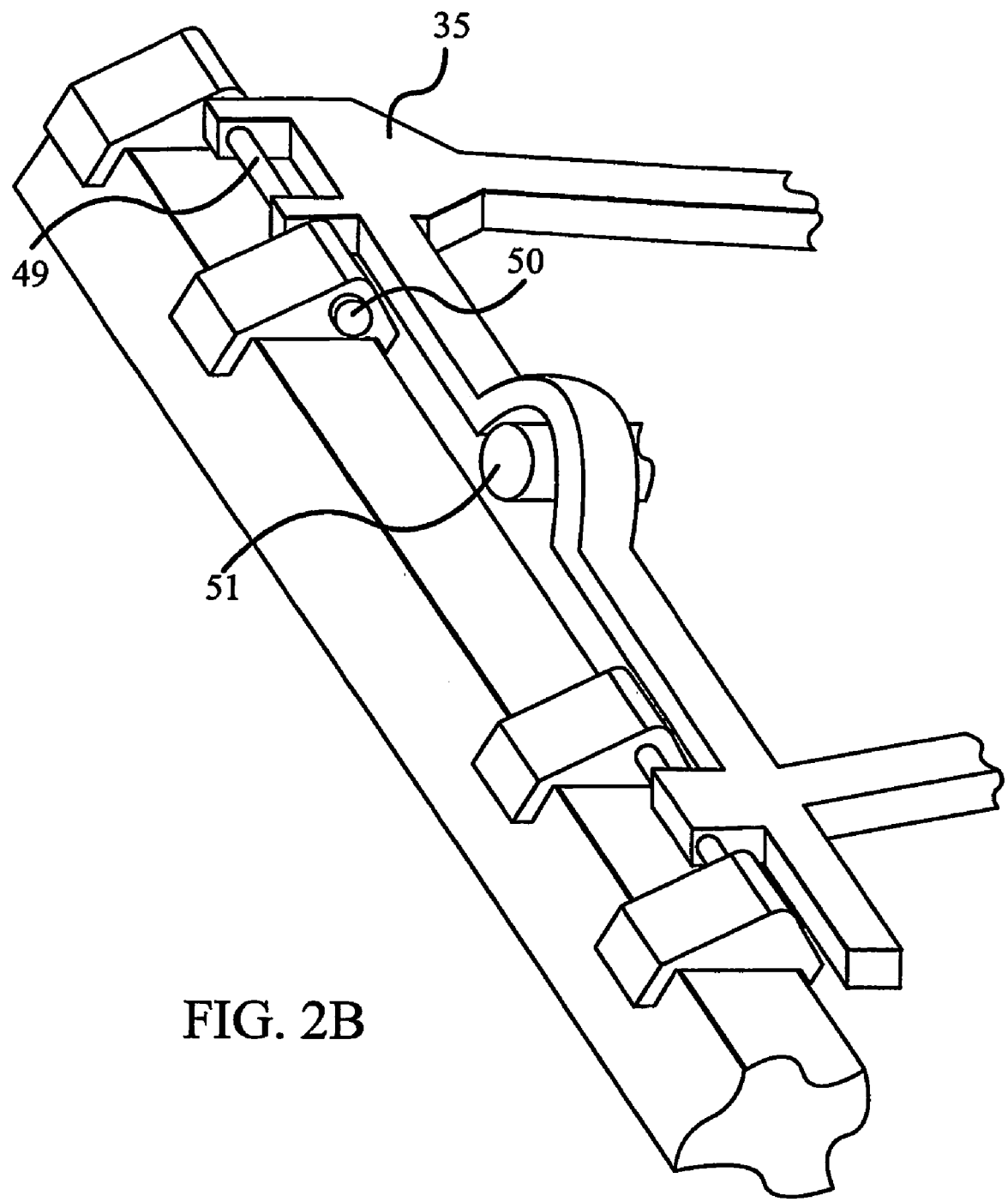
FIG. 2B is a perspective view of a portion of an underside of the frame and suspension in a region indicated by arrow 2B in FIG. 2A.

FIG. 2B is a perspective view of an underside of the frame 20 in a region indicated by arrow 2B in FIG. 2A. FIG. 2B shows a connection of the lower arm 35 by way of a lower arm pin 49 that is press fit or otherwise fixed to the lower arm 35. The lower arm pin 49 rotatably moves in a bore in the frame 20. An inboard position sensor 50 is fixed to the frame 20 in alignment with the pin 49 to sense a rotational position of the lower arm relative to the frame 20. The position sensor 50 can be provided as a potentiometer similar to those to be described below with regard to outboard position sensors.

Figure 3A:
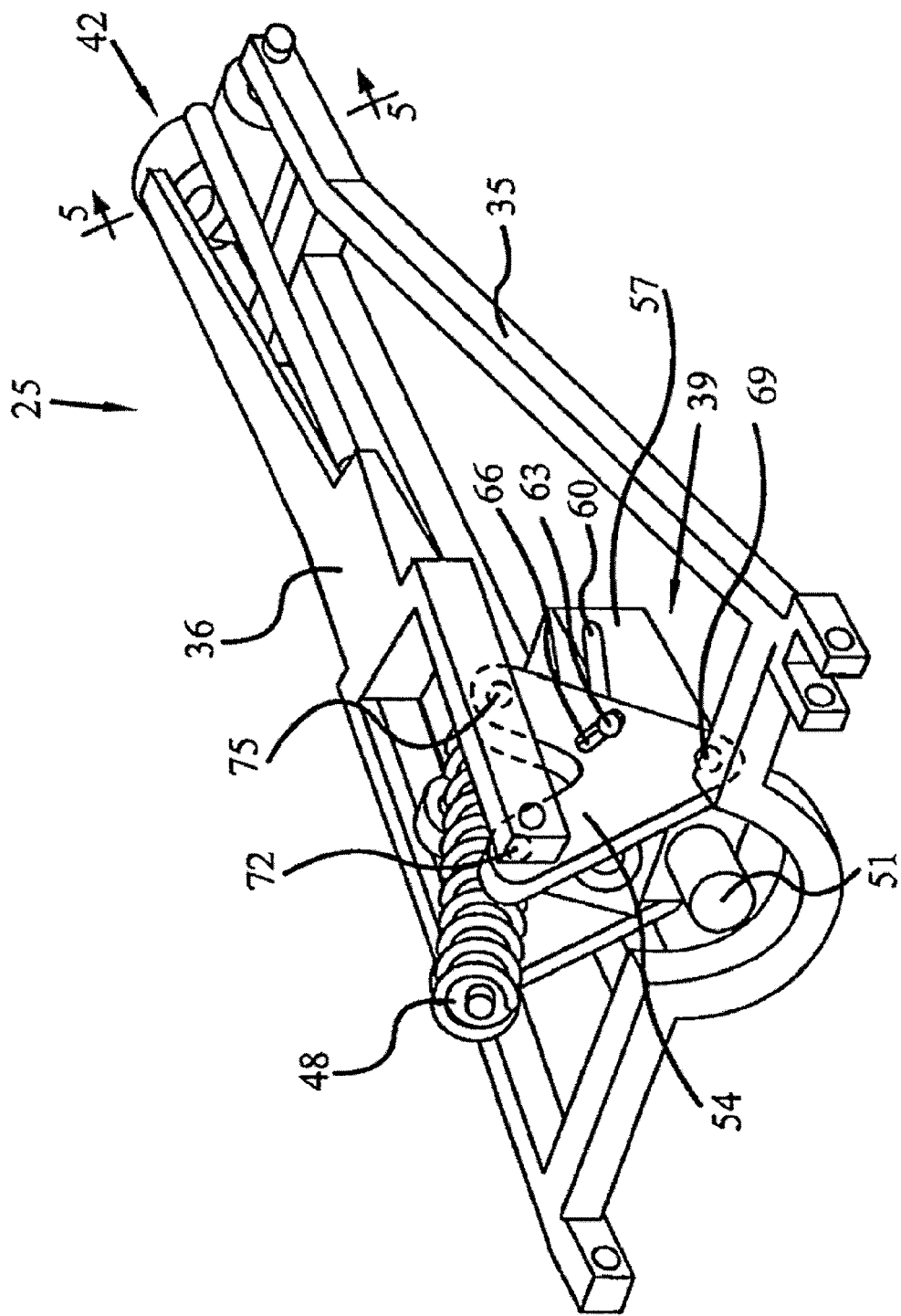
FIG. 3A is a perspective view of an arm assembly of the suspension according to the embodiments of FIGS. 1-2 above.

FIG. 3A shows one embodiment of the arm assemblies 25 in a perspective view. The actuator includes a motor 51 mounted to the lower arm 35. The motor 51 is motively connected to an actuator arm 54 through an actuator housing 57. The actuator arm 54 is pivotally mounted on the housing 57 at a first connection 69. The actuator housing 57 has a drive slot 60 in which a cam pin 63 is caused to move by the motor 51. The cam pin 63 also extends into a cam slot 66 in the actuator arm 54. As can be appreciated, moving the cam pin 63 along a length of the drive slot also forces or cams the actuation arm to move through a predetermined range of motion. Movement of the actuation arm causes the upper control arm 36 that is pivotally connected to the actuation arm at a second connection 72 to move. The portion of the actuator arm 54 between the first connection and the second connection generally provides one side of a parallelogram formed by the arm assembly 25. A generally parallel opposite side is provided by the hub assembly 42. It is to be noted that the actuator arm can be one of a pair of actuator arms 54 that straddle the actuator housing for added strength and durability.

The shock absorber 48 is connected to the actuator arm 54 at a third connection 75 that is disposed at an angle from the second connection relative to the first connection 69. The angle is defined as the angle between respective lines through the first and second connections and through the first and third connections. This angle can be in the range from zero to ninety degrees. Specifically, this angle is normally selected to be approximately forty-five degrees. The third connection 75 is located outboard of the second connection 72. That is, when the arm assembly is on a vehicle, the third connection 75 will be located farther from the frame than the second connection. The third connection 75 is located above the upper control arm 36 at one end of the range of motion. The third connection 75 is below the upper control arm 36 at the other end of the range of motion. Thus, the shock absorber 48 has an end to end position that is generally horizontal or parallel to a respective upper control arm 36 at one end of the range of motion. The shock absorber reaches a position that is at approximately forty-five degrees relative to planes defined by the upper control arm 36 and the lower arm 35 at the other end of the range of motion.

As can be appreciated, the present invention is configured to substantially balance centripetal forces, gravitational forces, and shock forces between arm assemblies on opposite sides of the frame.

The overall relationship between the shock absorbers 48, upper control arms 36, lower arms 35, and the actuator arms 54 is such that a mechanical advantage is maintained generally the same throughout the range of motion of the arm assemblies 25. For example, this is due in part to the connection 75 of the shock absorber 48 to the actuator arm 54 rising from a position nearly on the same plane as the lower arm 35 to a position above the upper control arm 36. This added height to the shock absorber connection provides a lever arm for horizontal forces applied through the upper control arm 36. On the other hand, the reorientation of the shock absorber on the other side of the frame to a generally forty-five degree angle better positions the shock absorber 48 to receive the additive forces that are typical for lean in that direction. In other words, the system is constantly reorienting the shock absorbers, upper control arms, actuator arms and frame to enable the shock absorbers to efficiently handle the forces applied to the arm assemblies 25. Hence, the system maintains a balance and a mechanical advantage for the shock absorbers to effectively receive the forces applied to the suspension system throughout the range of motion of each of the arm assemblies 25.

It follows that by the placement of the actuator arms 54 relative to the frame 20, 23, 34, upper control arms 36, lower arms 35, and relative to the shock absorbers 48, a mechanical advantage is achieved and maintained for both sides of the vehicle 10.

Furthermore, the shock absorbers 48 are better able to handle forces as the lean of the frame 20, 23, 34 and vehicle 10 increases. This is important because the remaining range of motion of the arm assemblies 25 in their leaned positions is limited and additional shock may need to be absorbed by the shock absorbers 48. On the other hand, much of the shock can be absorbed by a tracking function effectuated by moving the arm assemblies 25 by the actuators 39 as will be described in greater detail below.

It is to be understood that the upper control arms 36 and the lower arms 35 may be interchanged and still provide the same advantages described above. That is, while the actuator housing 57 and the motor 51 are shown and described above as being fixed to the lower arm 35, they could just as easily be mounted on the upper control arm 36. In this configuration, the actuator arms 54 would motively actuate the lower "control" arms 35 while the generally parallelogram configuration would be maintained similar to the embodiments described above. Alternatively described, the entire frame and arm assemblies could be turned over so that the shock absorbers are generally down and the actuators are generally up. Some additional modifications may be required to make such a frame and suspension function properly. However, it appears that many if not all of the advantages described above could be achieved by this reversal of parts, and doing so is considered to be within the spirit and scope of the invention.

Figure 3B:
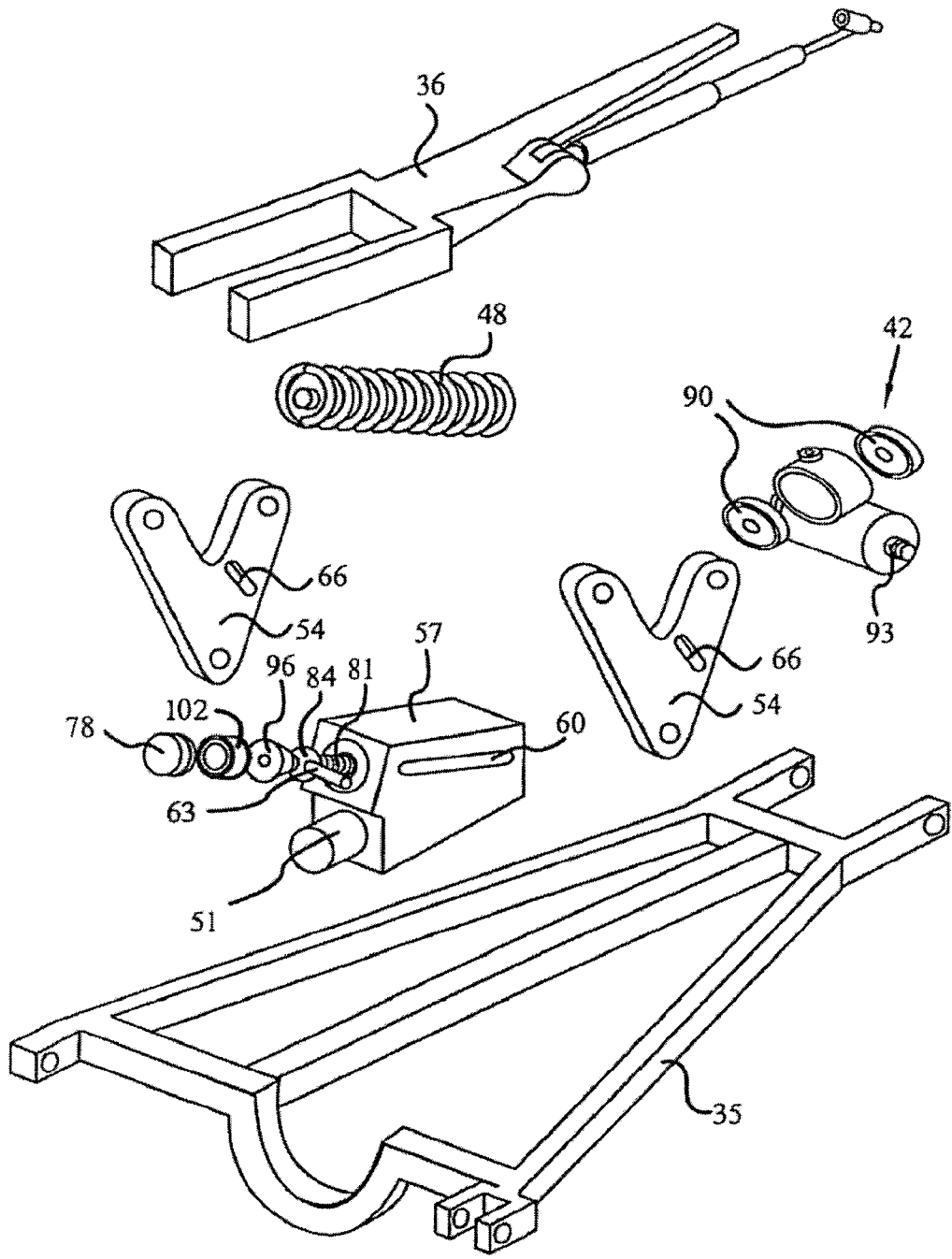
FIG. 3B is an exploded perspective view of the arm assembly of FIG. 3A.

FIG. 3B is an exploded perspective view of the arm assembly 25 showing additional details. For example, the actuator housing 57 has a lead screw cover 78 enclosing the lead screw 81 and its associated components. A ball nut 84 is received on the lead screw 81 and moves along a length of the lead screw 81 as the motor 51 is run. The cam pin 63 is provided by oppositely extending shafts that are rigidly connected to the ball nut 84 and extend outwardly from the ball nut 84 in order to engage in the drive slot 60 and the cam slot 66. Typically the ball nut 84 and the cam pin 63 are one integral piece.

The hub assembly includes a pair of hub bearings 90 for rotatably supporting an axle in known configurations. The axle may include a plurality of universal or constant velocity joints. The hub assembly 42 also includes a hub pin 93 that is to be press fit or otherwise fixed to a lower end of the hub assembly 42. The hub pin 93 is rotationally supported on an outboard end of the lower arm 35 as will be described in greater detail below.

Figure 4A:
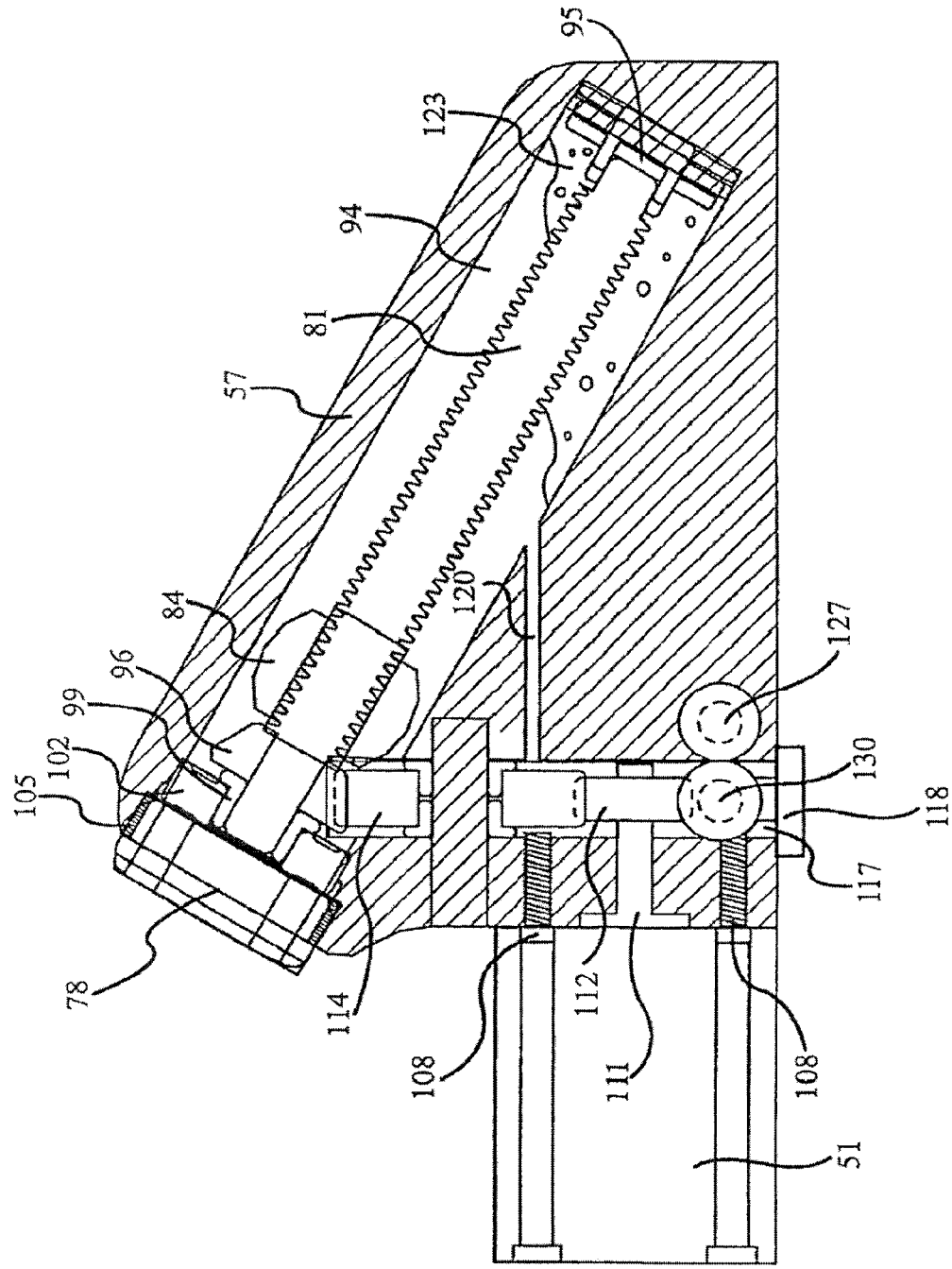
FIG. 4A is a side sectional view of the actuator housing.

FIG. 4A is a sectional view of the actuator housing 57. The lead screw 81 and ball nut 84 are received in a lead screw opening 94. The lead screw opening 94 can be provided by boring the housing 57. A thrust bearing 95 is disposed at a lower end of the opening 94 for receiving a lower end of the lead screw 81. The lead screw 81 has a lead screw gear 96 for receiving a driving force, a bushing 99, and a thrust bearing 102 supported thereon. The lead screw 81 and its associated components are enclosed by the lead screw cover 78. This can be accomplished by providing a threaded connection 105 between the cover 78 and the housing 57. A seal may also be provided between the cover 78 and the housing 57.

The motor 51 is mounted on the housing 57 such as by screws as indicated at 108. Mounted thus, a motor drive shaft 111 extends into the housing 57. A drive gear 112 drives an idler gear 114, which drives the lead screw gear 96. The drive gear 112 and the idler gear 114 are received into a gear train opening 117. The gear train opening 117 is closed by a gear train cover 118 which can be attached to the housing 57 by screws or the like. A seal may be placed between the gear train cover 118 and the housing 57. Furthermore, a seal in the form of telescoping plates or a resilient material may be provided to close the slot 60 shown in FIGS. 3A and 3B. Such a seal is designed to accommodate the movement of the cam pin 63 in the drive slot 60, (shown in FIGS. 3A and 3B), while substantially sealing an interior of the housing 57. With further reference to FIG. 4A, at least one through bore 120 may be formed as an extension from a screw hole for screws at 108 into the lead screw opening 94. The through bore 120 thus provides a flow path for an oil bath 123 that circulates about and cools the lead screw 81 and its components. It is to be understood that the motor and lead screw may be rotated exceedingly fast. Hence, the oil bath 123 is usually needed to prevent overheating and failure of the components. It is to be further understood that the lead screw can be replaced by a worm gear that would provide even faster actuation or permit fast actuation at lower revolutions per minute of the motor. However, the surface area of engagement between the worm gear and splines that the worm gear motively engages is very small. Hence, the strength of the actuator will be greatly reduced. Further alternatively, the motor could have an integral lead screw and could be mounted substantially in the location of the lead screw cover 78.

Still further alternatively, the actuator motor 51 could be disposed at ninety degrees relative to the position shown in FIGS. 2A, 2B, 3A, 3B, and 4A and can be provided with a worm gear output for driving drive gear 112. Mounting the actuator motor 51 in this manner has the advantage of isolating the lead screw 81 and thus inhibiting back driving of the actuator motor 51 by forces on the suspension arms.

The actuator includes the motor 51, the actuator housing 57 with its contents, and at least part of the actuator arms 54. Alternatively, the actuator 39 could be replaced by a linear actuator that is pivotally mounted to the lower arm 35 or the upper control arm 36 and pivotally mounted to the actuator arm. However, it is to be understood that the actuator mechanism inhibits back driving of the mechanism by forces applied through the shock absorber 48.

Figure 4B:
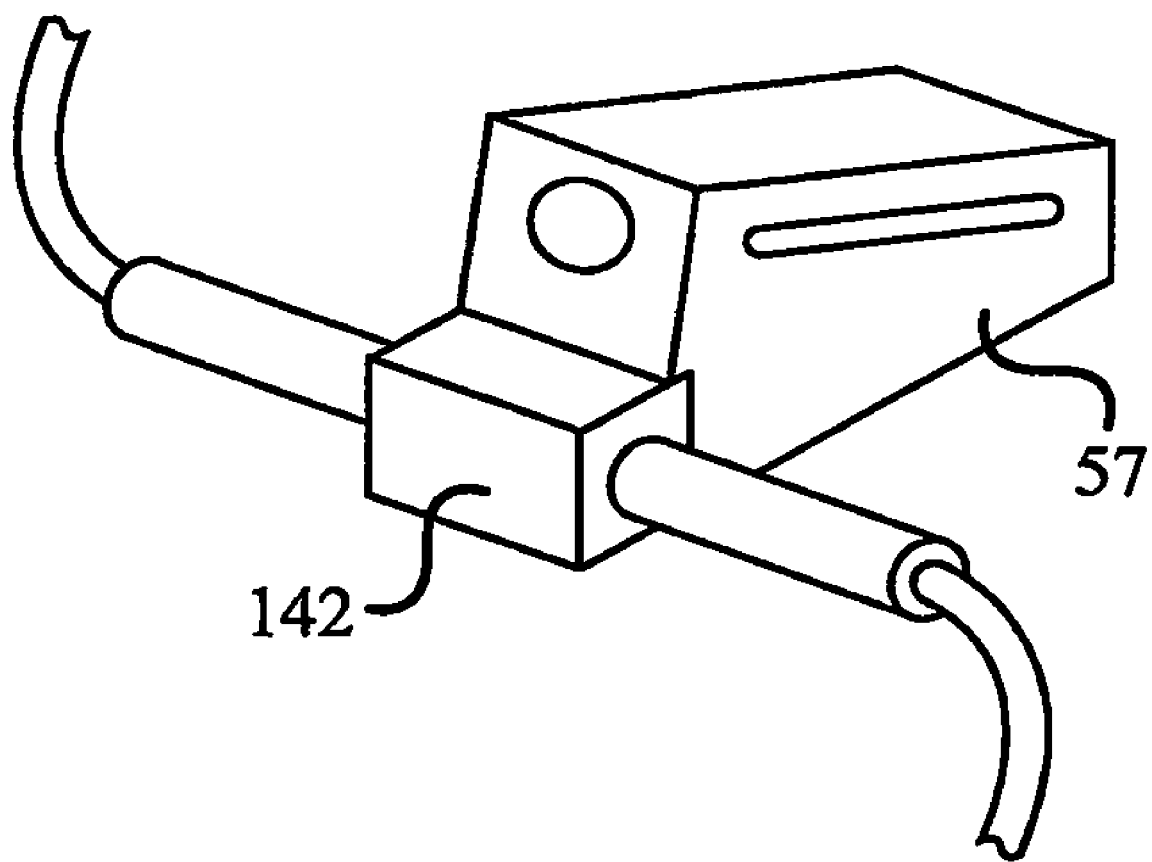
FIG. 4B is a perspective view depicting an actuator drive.
Figure 4C:
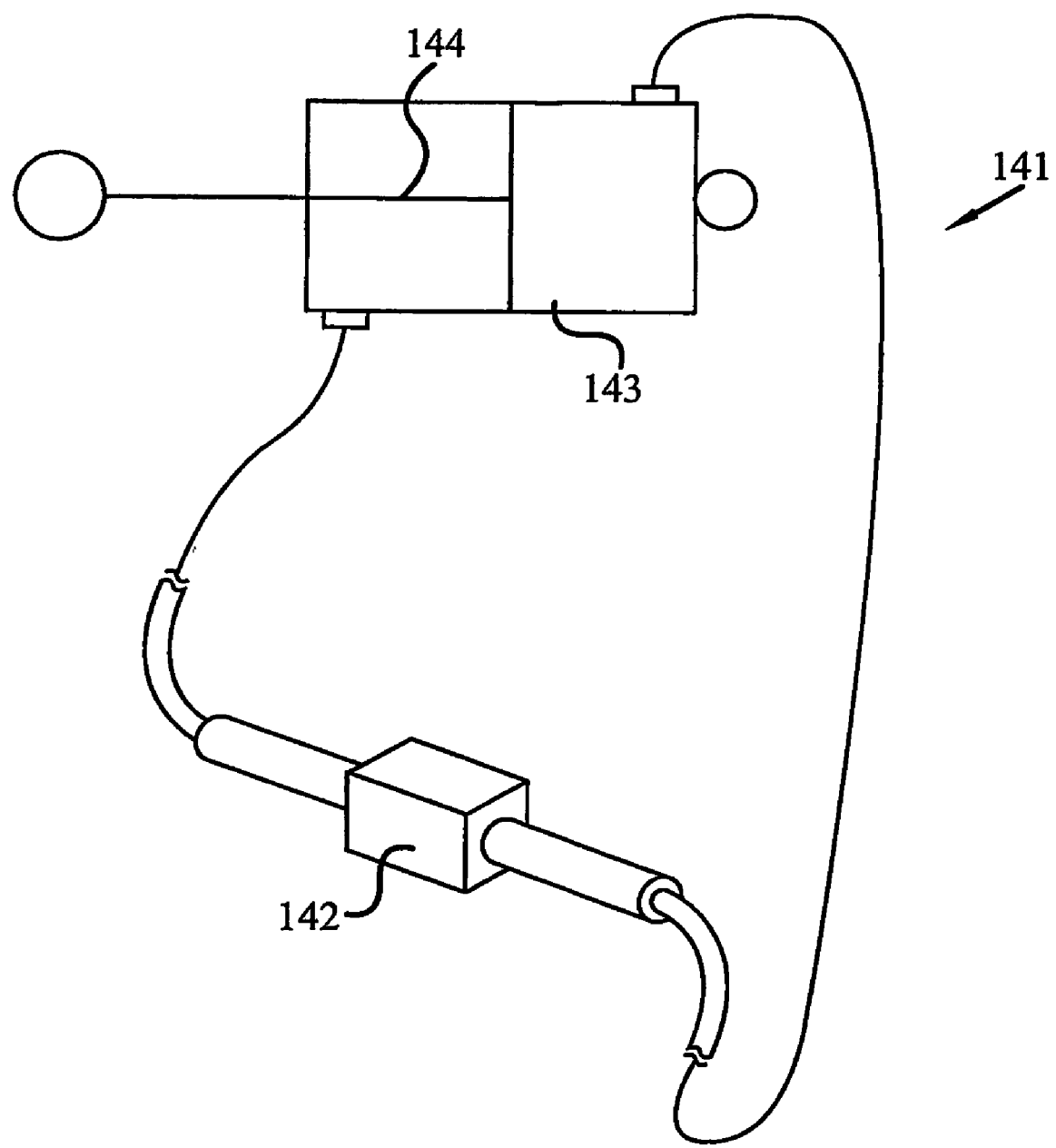
FIG. 4C is a partial schematic view of the actuator drive of FIG. 4B showing a connection to a fluid transfer device.
Figure 4D:
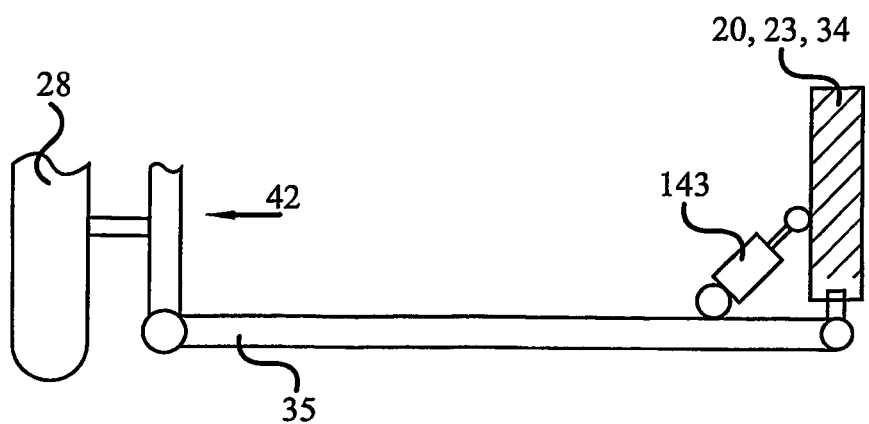
FIG. 4D is a partial end view showing the connection of the fluid transfer device of FIG. 4C to a frame and a suspension of the present invention.

FIGS. 4B-4D show an alternative actuator drive mechanism 141 that can be substituted for motor 51. The drive can include a drive in the form of a fluid driven rack and pinion 142 mounted to the actuator housing 57 by conventional means in lieu of the electrical motor 51. The rack and pinion is actuated by a transfer of fluid from an actuation cylinder 143. The actuation cylinder may be a cammed cylinder that has a piston 144 that is forced from one end to the other end of the actuation cylinder 143 when the frame 20, 23, 34 is leaned relative to the lower arm 35. Movement of the piston 144 simultaneously transfers fluid through lines from one side of the rack and pinion 142 and to the other side of the rack and pinion 142. This plurality of lines is not necessary, but provides the advantage of redundancy. Thus, the rack and pinion is actuated and in turn drives the gears within the housing 57. This mechanical actuator drive 141 enables a user to manually actuate the lean of the vehicle by shifting his or her weight to lean the frame 20, 23, 34 towards the lower arm 35. As can be appreciated, a similar actuator drive mechanism 141 can be incorporated into each of the actuators and the actuation cylinder 143 can be placed at respective positions between the frame 20, 23, 34 and the actuator housings 57. A similar result could be achieved by alternative mechanical devices that include a set of gears, for example. The set of gears in this case would be set in motion by the user shifting his or her weight. Such a mechanical device could drive the gears in the housing 57 instead of the electrical motor 51 or the drive mechanism 141.

Figure 4E:
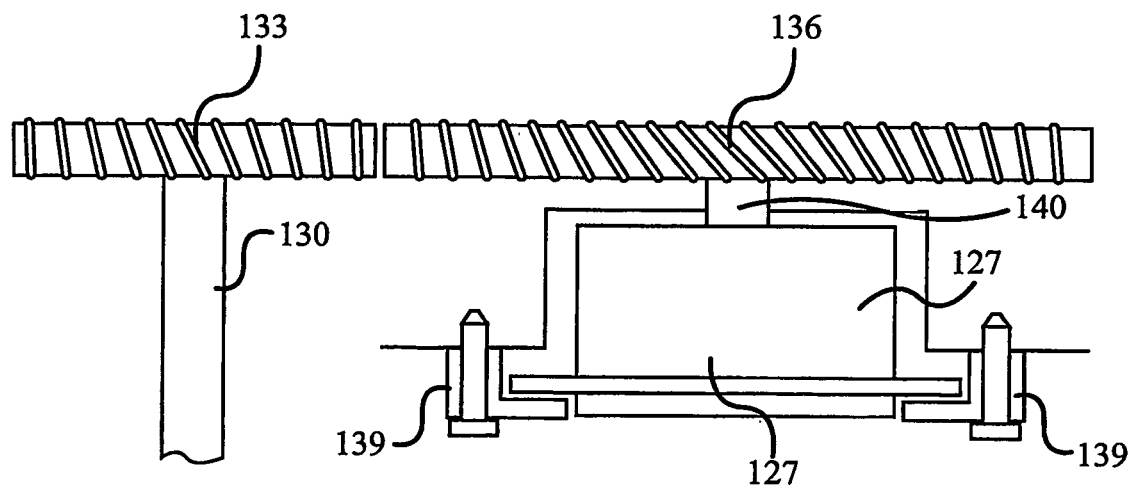
FIG. 4E is a sectional view of an outboard position sensor.
Figure 4F:
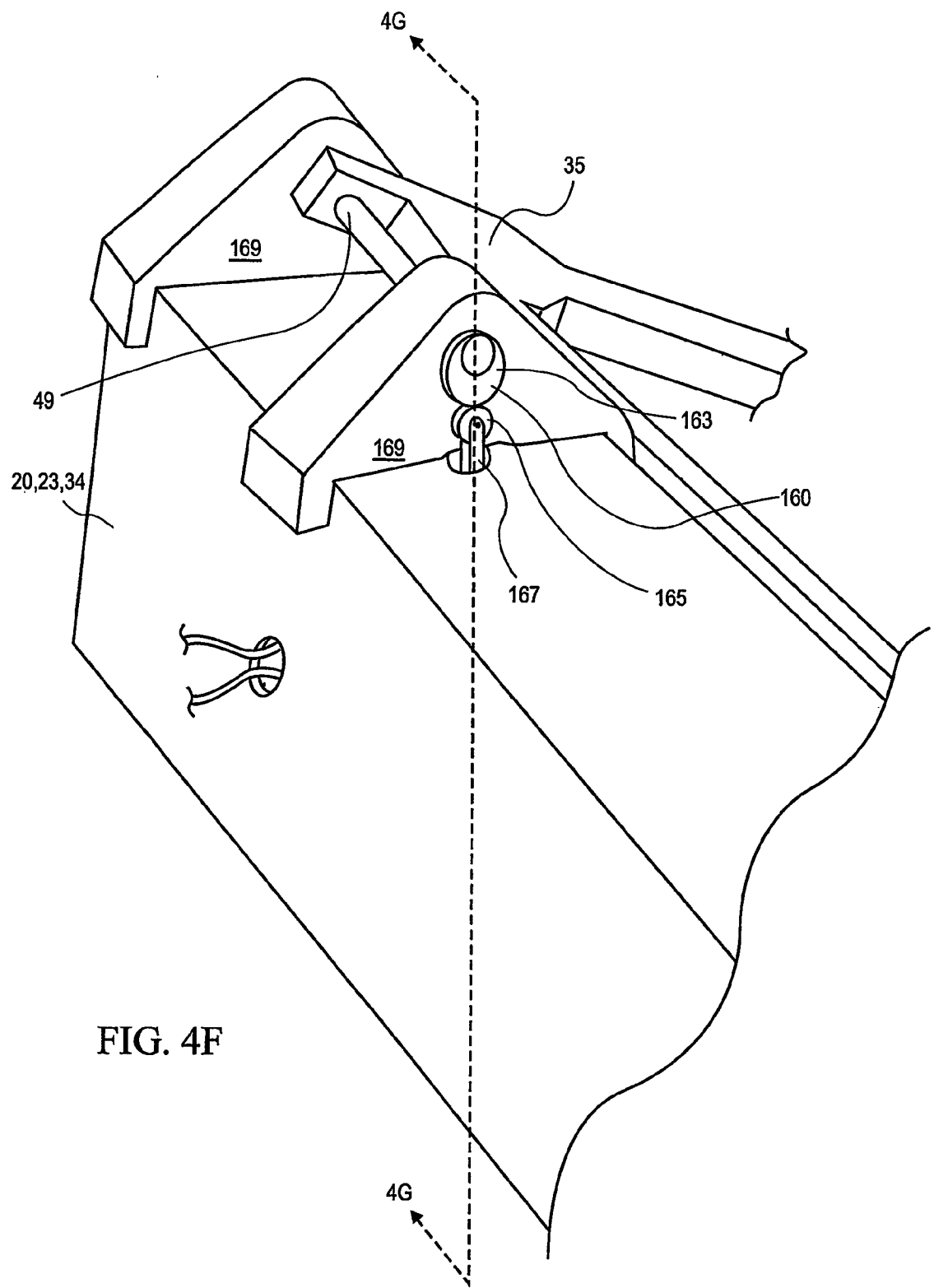
FIG. 4F is a perspective view similar to FIG. 2B and showing an alternative arrangement for the fluid transfer device.

FIG. 4F is a perspective view of an underside of the frame 20, 23, 34 similar to FIG. 2B, but showing an alternative embodiment for the sensing and actuation systems. In particular, the position sensor 50 that is useful with the motor driven embodiment can be replaced by a mechanical sensing device in the form of position indicator cam 160 fixed on the pin 49. Since the pin is fixed relative to the lower arm 35, the position indicating cam represents the position of the lower arm 35 relative to the frame 20, 23, 34. A lobe 163 of the cam 160 engages a roller 165 or other contact end of an actuation cylinder shaft 167 so that as the lower arm 35 is rotated relative to the frame 20, 23, 34, the actuation cylinder drive shaft 167 is moved accordingly. It is to be understood that the pin 49 may be splined or otherwise keyed and the bore of the lower arm 35 into which the pin 35 fits may have mating structure to prevent rotational movement between the pin 49 and the lower arm 35. It is further to be understood that the cam shown in FIG. 4F can be replaced by any appropriate eccentric including a circular eccentric. The embodiment of FIG. 4F can be used in place of the embodiment showing the actuation cylinder 143 between the frame 20, 23, 34 and one of the arms 35 shown in FIG. 4D.

FIG. 4F only shows one lower arm supported on extended brackets 169. As can be appreciated from FIGS. 2B-3B, right and left lower arms 35 interleaf with each other between the brackets 169. Two sets of brackets support a pair of right and left lower arms as can be appreciated from FIG. 2B. Thus, in order to provide feedback from both right and left lower arms 35 of a pair, a position indicator cam 160 for one arm can be supported on a first pair of brackets as shown in FIG. 4F and another position indicator cam 160 fixedly connected to the other lower arm 35 can be supported on a the second pair of brackets. In this way, position indication cam operation can be provided for each of the lower arms independently. Other positions for the position indicator cam 160 and the actuation cylinder drive shaft 167 can be implemented without departing from the spirit and scope of the invention.

Figure 4G:
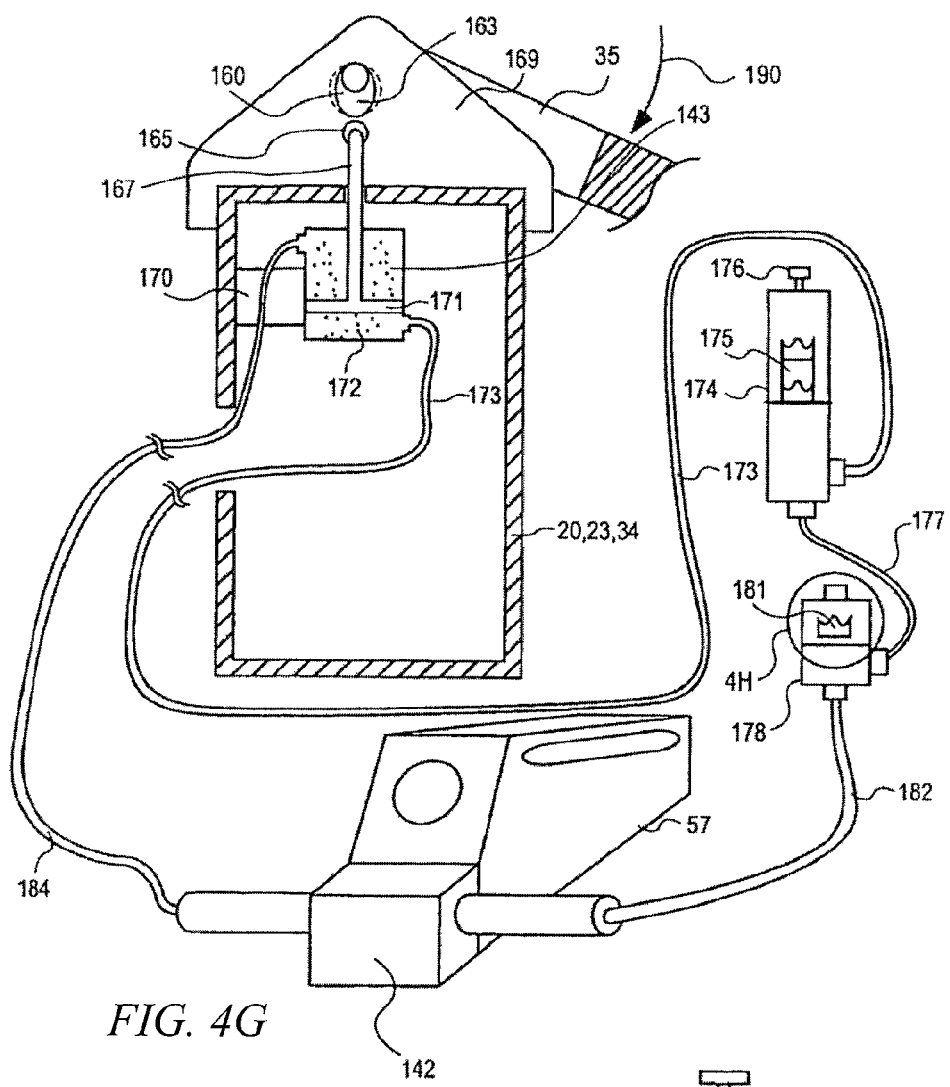
FIG. 4G is a sectional view taken along lines 4G-4G of FIG. 4F.

FIG. 4G is a sectional view taken along lines 4G-4G of FIG. 4F showing the actuation cylinder 143 positioned inside the frame 20, 23, 34. The actuation cylinder can be mounted by a bracket 170 in a position that enables the lobe 163 to properly transmit a representation of a position of the lower arm 35 operably connected to the position indicator cam 160. Thus, as the lower arm is moved closer to the frame as shown in FIGS. 4F and 4G, the position indicator cam 160 exerts a force on the shaft 167 of the actuation cylinder 143. The shaft 167 in turn causes a plunger 171 to force a fluid 172 out of one end of the cylinder 143 and into a first fluid line 173. At the same time, fluid 172 is drawn into the other end or the actuation cylinder 143 as can be appreciated from FIG. 4G. The fluid 172 that is forced out of the actuation cylinder 143 moves through a first fluid line 173. The fluid 172 is substantially non-compressible so that the fluid 172 is also forced from the first fluid line into a fluid reservoir 174. A first portion of the fluid reservoir 174 includes an adjustable spring 175 for absorbing shocks in the fluid system. The spring 175 can comprise a mechanical spring, a gas spring, or a combination mechanical and gas spring. The gas spring aspect of spring 175 may be provided as an air spring. The mechanical and/or gas spring can be pressurized to adjust spring stiffness. The first portion of the reservoir 174 may be separated from a second fluid containing portion of the reservoir 174 by a slidable partition so that the second portion is expansible to hold greater or smaller amounts of the noncompressible fluid. An adjustment knob 176 can be provided by a head of a threaded shaft that enables threaded adjustment of the spring 175 to a greater or lesser spring stiffness.

In this way, if the lower arm 35 experiences a strong deflection by a bump and transfers a load to the actuation cylinder 143 via the position indicator cam 160, then a proportionally strong load will be transferred through the fluid to the fluid driven rack and pinion 142. To avoid too great of shock loads, the spring 175 can be adjusted so that fluid 172 entering the reservoir 174 causes temporary contraction of the spring 175 while the second portion of the reservoir expands. This spring adjustability in combination with a pressure control valve 178 provides a safety mechanism that prevents a pressure from becoming too great. Thus, the pressure control valve inhibits blow out of the lines and keeps other components from breaking under pressure in the fluid system or from forces exerted thereby. This safety feature thus safeguards against exposing gearing in the rack and pinion 142 and within the actuator housing 57 to forces that may cause failure in the gearing or other components.

Figure 4H:
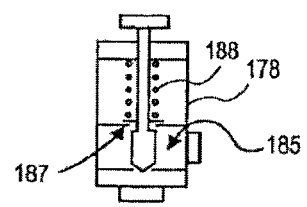
FIG. 4H is a schematic sectional view of a region 4H of FIG. 4G.

A portion of the fluid 172 is forced from the reservoir 174 into a second fluid line 177 either immediately or as the spring 175 relaxes. In turn, the fluid 172 is forced into the pressure control valve 178. The pressure control valve comprises a combination flow rate control mechanism and a pop off valve 181 as indicated in FIG. 4G. FIG. 4H shows the separate components of the combination mechanism 181. The flow rate, and thus the pressure, in the fluid system due to forced flow is controlled by a needle or other valve 185 that controls the opening size through which the fluid 172 passes. When pressures reach a predetermined threshold, a pop off valve 187 permits the fluid 172 to escape in a controlled or metered fashion. This can be provided by a spring 188 provided at a preselected compression. Thus, the pop off valve 187 is an additional safety mechanism that protects the fluid system, gearing and other vulnerable components when the system experiences large shock loads.

In use, restriction by the needle valve 185 causes greater back up of fluid 172 in the fluid reservoir 174 with an increased flow rate if the loads on the suspension are sufficiently high. Increased restriction by the needle valve 185 under these conditions results in lower flow rates in a third fluid line 182 connecting the pressure control valve 178 to the fluid driven rack and pinion 142. Thus, the increased restriction results in less movement in the actuator and more shock absorption by the spring 175 in the fluid reservoir 174. The flow rate of fluid into the reservoir is a function of suspension movement relative to the frame 20, 23, 34. The suspension movement in turn is a function of how fast the vehicle is traveling, how big is an encountered bump, and how the rider's weight is distributed and transferred. Therefore, the fluid reservoir 174 and the pressure control valve 178 are incorporated so that quick high force suspension movements are converted into less mechanism movement in the respective actuators and so that greater shock absorption in the spring 175 in the reservoir occurs for quick, high force shocks to the system.

Adjusting an air pressure or a spring rate of the spring 175 controls how much fluid enters the reservoir. By reducing the pressure of the spring, more fluid is permitted to enter the reservoir for a particular force on the lower arm 35. When more fluid enters the reservoir, less fluid is immediately transferred toward the fluid rack and pinion 142. Therefore, the rack and pinion and actuator mechanisms experience less movement. Instead, the movement is taken up by the spring 175 in the reservoir 174 for greater shock absorption. This arrangement thus inhibits detrimentally high pressures and flow rates through a high pressure side comprising the first, second, and third fluid lines 173, 177, 182 connecting the actuation cylinder 143 and fluid driven rack and pinion 142. This, in turn, provides for less wear and tear on the mechanisms. It is to be understood that an air pressure of the spring 175 may be controlled by the vehicle speed. In any case, the above described safety and shock absorption features in the fluid actuation system enable the rider to lean smoothly remaining substantially in line with the wheels.

When the load is withdrawn and the lower arm 35 moves in a direction away from the frame as shown in FIG. 2B, the fluid 172 flows freely in the opposite direction through the control valve 178, fluid reservoir 174, and into the actuation cylinder 143. The fluid also flows out of a low pressure side of the actuation cylinder 143 and into a fourth fluid line 184 and into a low pressure side of the fluid driven rack and pinion 142. An equilibrium pressure can be adjusted to urge the plunger 171 and the actuation drive shaft 167 into a non-deflected position when the position indicator cam 160 is rotated away from the actuation cylinder 143. As can be appreciated, the suspension arms are not regularly forced downward (in a direction opposite to arrow 190 in FIG. 4G) by impact forces from going over bumps. Furthermore, forces moving the suspension arms away from the frame 20, 23, 34 are much less than those forces moving the suspension arms toward the frame 20, 23, 34. Therefore, the safety features are only needed on the high pressure side or portion of the fluid system that sends fluid 172 to the fluid driven rack and pinion 142 as the lower arm is moved in a direction of the arrow 190 toward the frame 20, 23, 34 as shown in FIG. 4G.

It is contemplated that a solenoid valve can be provided in the fluid system to stop the fluid flow. Thus, the solenoid valve can be selectively activated to stop the flow and maintain the suspensions in their current position. This feature could be particularly advantageous, for example, when the vehicle is in a leaned state on the side of a hill. Thus, the solenoid valve could be activated to prevent inadvertent leaning down hill.

Figure 5:
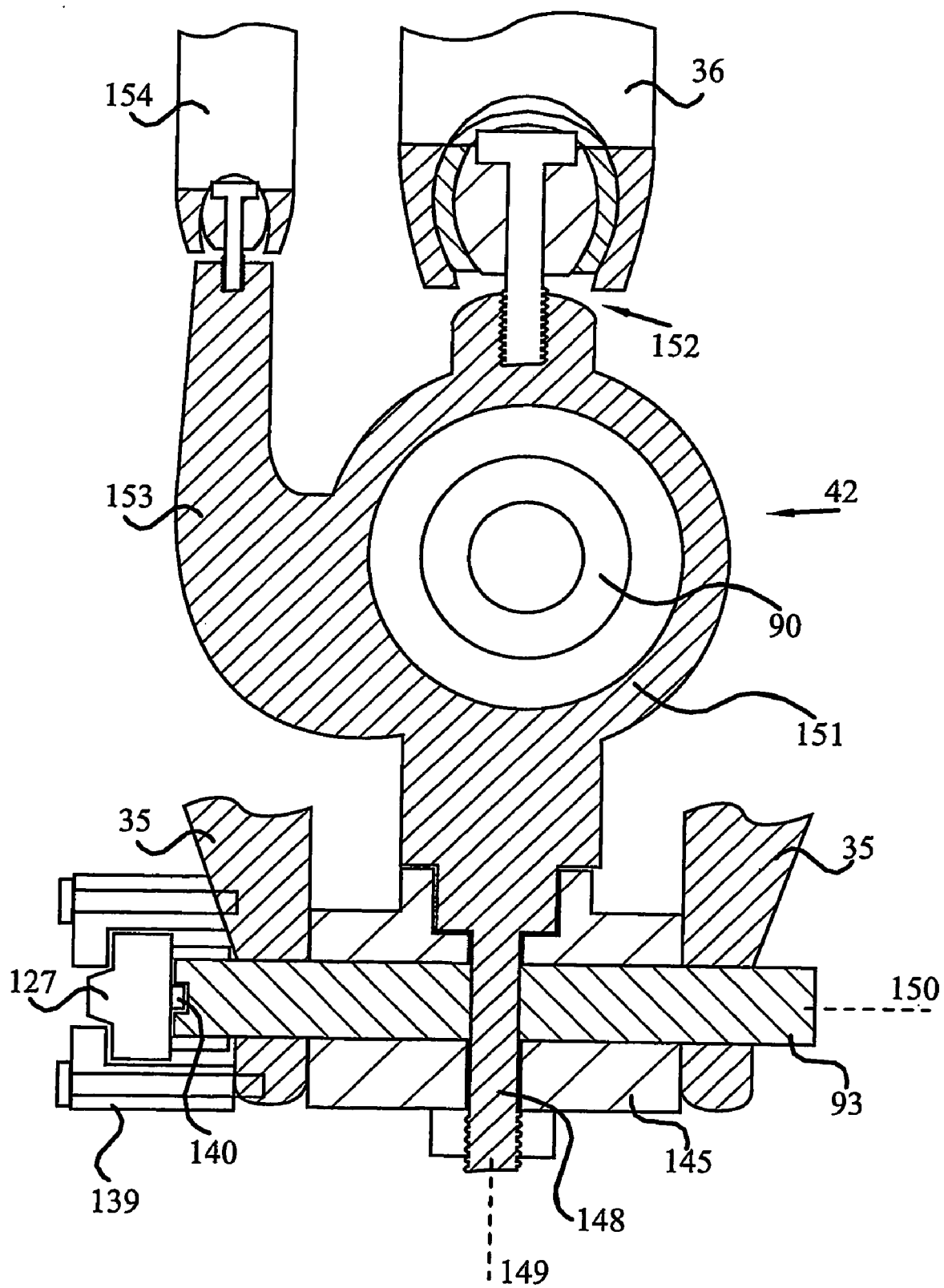
FIG. 5 is a sectional view of a hub assembly taken along lines 5-5 of FIG. 3A.

Further shown in the embodiment of FIG. 4A, a position sensor 127 in the form of a potentiometer is fixedly mounted in the housing 57 proximate to a first connection pin 130. As shown in FIG. 4E, the first connection pin 130 has a gear 133 fixed thereon. The first connection pin 130 is press fitted or otherwise fixed to the actuator arms 54. Thus, as the actuator arms are rotated, the first connection gear 133 is rotated through an equivalent angle. The first connection gear registers with a potentiometer gear 136 so that the angle of rotation of the actuator arm 54 is sensed by the potentiometer of the position sensor 127. The potentiometer is held in place on the housing by a bracket 139. Loosening the bracket allows rotation of the potentiometer for proper calibration before tightening again. The potentiometer is an outboard position sensor since the angular movement, between the actuator arm 54 and the housing correspond to the angular movement between the hub assembly 42 and the lower arm 35. Alternatively, the potentiometer could be fixedly mounted to the lower arm 35 in alignment with the hub pin 93 and an input shaft 140 of the potentiometer could be non-rotatively coupled to an end of the hub pin 93 as shown in FIG. 5. However, the outboard position sensor positioned thus could be more vulnerable to damage.

FIG. 5 is a sectional view of the hub assembly 42 taken along lines 5-5 of FIG. 3A. As shown, the hub pin 93 is press fit or otherwise fixed in the lower arm mount 145 of the hub assembly 42. The arm mount 145 and hub pin 93 have aligned through holes rotatively receiving a spindle pin 148 on a first axis 149. The arm mount 145 and hub pin 93 are rotatively connected to the outboard end of the lower arm 35 on a second axis 150. In the case of the outboard position sensor 127 being mounted in the actuator housing 57, the hub pin can be fixed to the lower arm 35 and rotatively received in the lower arm mount 145. In either case, the spindle housing 151 has two axes of rotational motion relative to the lower arm 35. A spherical bearing mount 152 rotatively connects an upper end of the hub assembly 42 to the upper control arm 36 so that it also has two axes of rotative motion relative to the upper control arm 36. Rotation of the spindle housing 151 about the second axis 150 is caused by movement of the upper control arm 36 relative to the lower arm 35 when actuated by the actuator 39. Rotation of the spindle housing about the first axis 149 is caused by a turning force applied to the armature axis 153. The turning force is applied by a tie rod end 154 connected to a hydraulic cylinder, which may be a conventional hydraulic cylinder. The armature 153 in this application has strengthening webs and/or other structure to withstand the strong turning loads that accompany large articulation angles about the two axes 149, 150. The loads can be especially large in racing and/or off-road applications.

Figure 6:
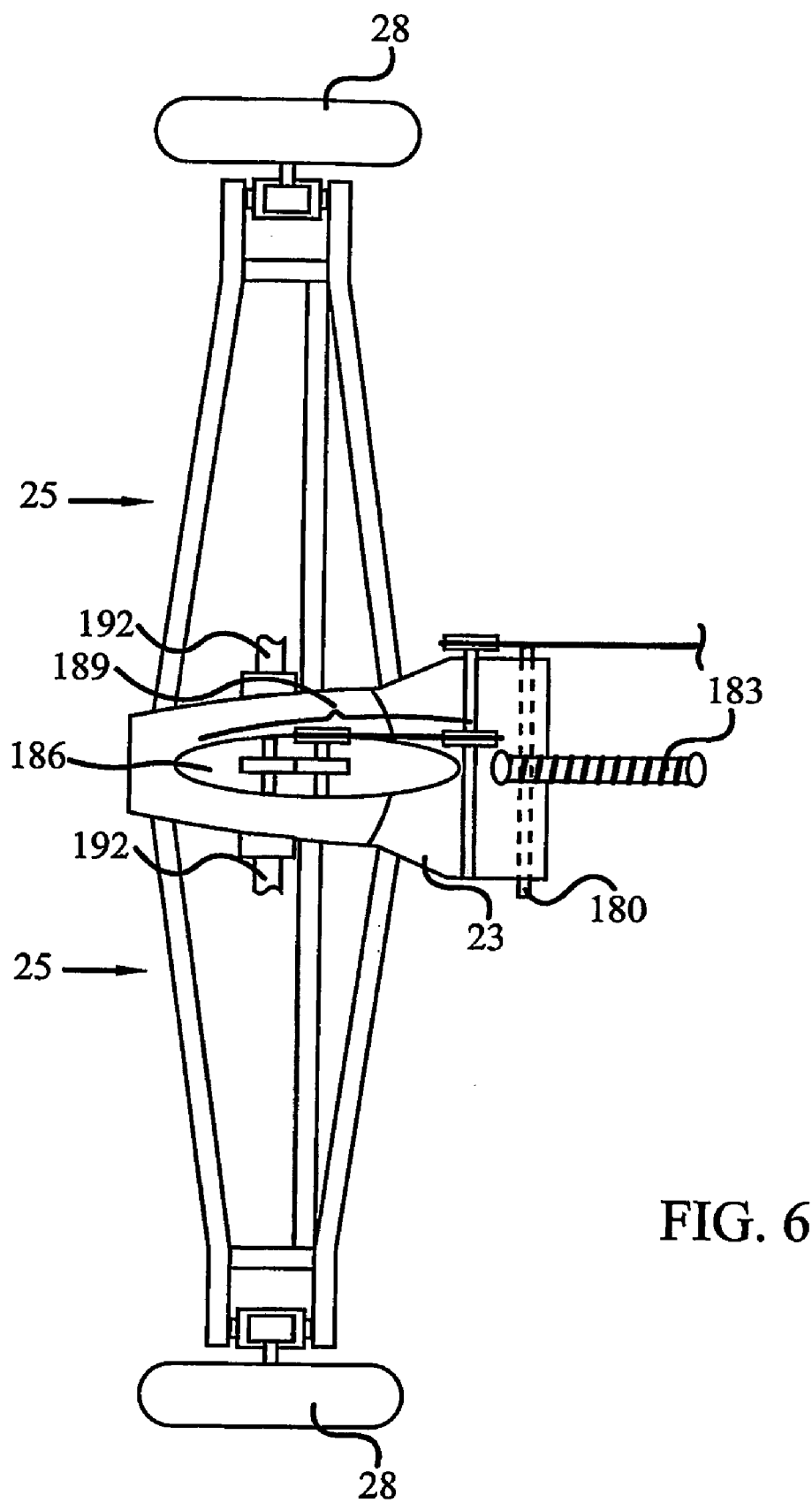
FIG. 6 is a top view of a frame and suspensions of the present invention, with the frame incorporated as a rear swing arm of a motorcycle.

FIG. 6 is a top view of the rear swing arm frame 23 that can be used in applications such as with the vehicle 10 of FIG. 1A. The rear swing arm frame 23 functions as a standard swing arm of a motorcycle and is mounted on a pivot pin 180. The swing arm frame 23 has a rear shock absorber 183 connected to the frame 23 and to the motorcycle analogous to standard rear shock absorbers in motorcycles. The swing arm frame 23 has a central opening 186 in which is disposed a differential 189. The differential is shown as a chain driven differential although a shaft driven differential is within the scope of the invention. The differential is connected to drive half shafts 192 that are normally motively connected to the wheels, but which are shown cut away for illustrative purposes. The half shafts 192 may incorporate telescoping pieces and a plurality of universal or constant velocity joints to accommodate the great amount of articulation in the arm assemblies 25. The differential can be a positive traction differential incorporating unidirectional bearings, for example. Similarly, the front wheels could also be driving wheels driven by similar half shafts, and the front frame 20 could thus have an opening and incorporate a similar differential 189.

Figure 7:
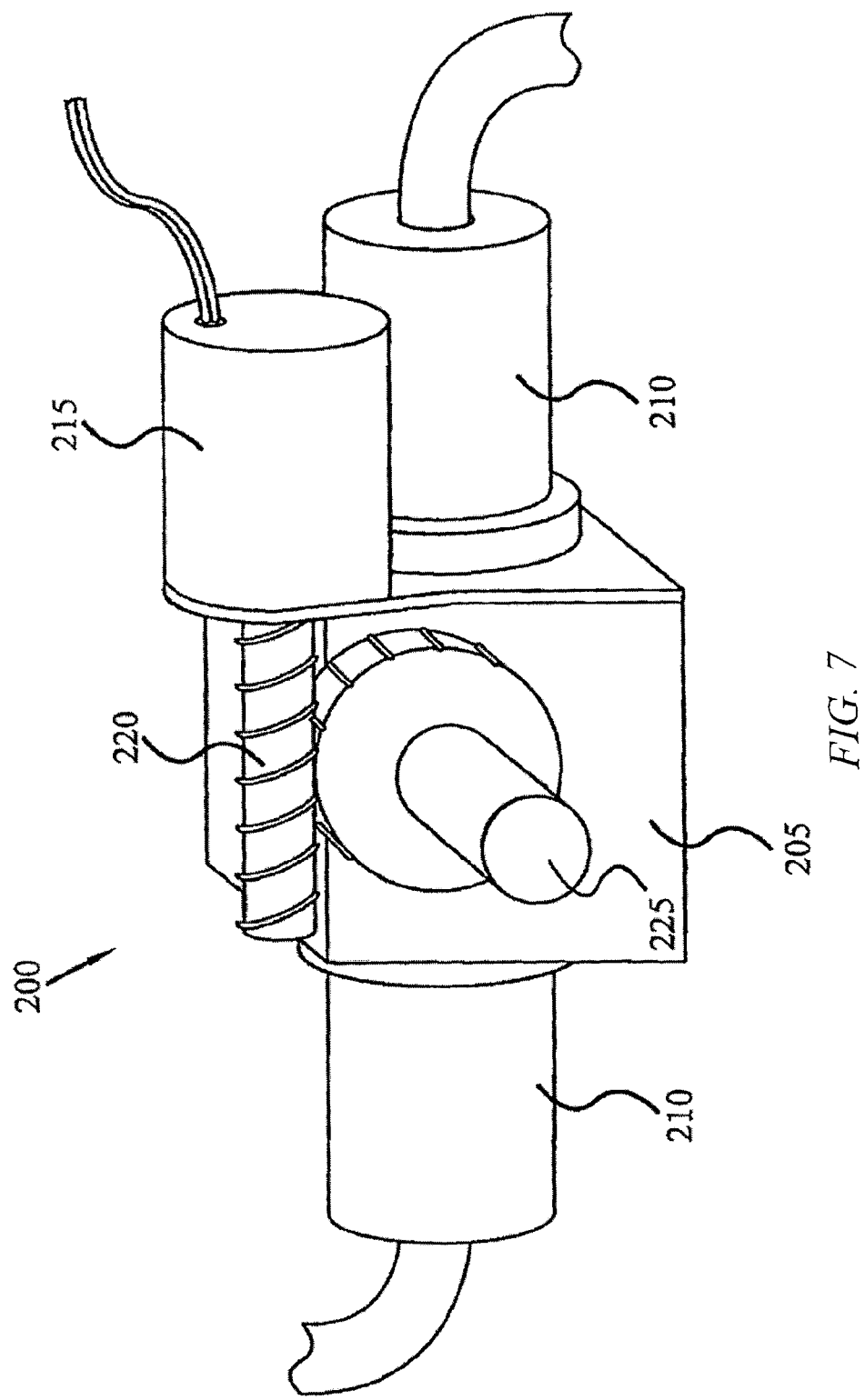
FIG. 7 is a perspective view of the rear steering mechanism according to the present invention.
Figure 8:
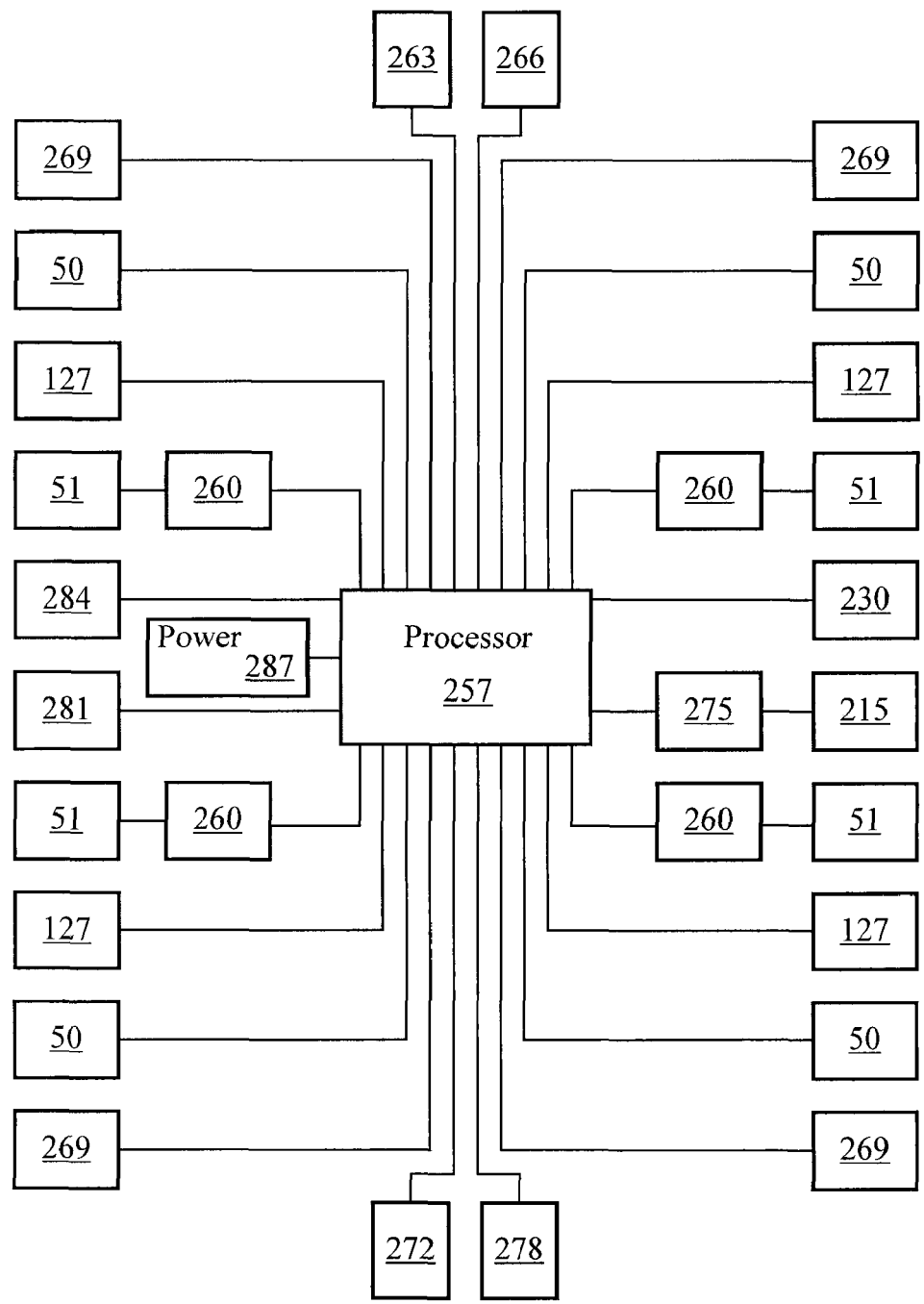
FIG. 8 is a block diagram depicting sensors, actuator motors, speed controllers, and an ECU that may be used in accordance with any of the embodiments of the present invention.

FIG. 7 is a perspective view of a steering mechanism 200 that can be incorporated for controlling the rear steering in a vehicle of the present invention. The steering mechanism incorporates a rotary rack and pinion 205. The rack moves pistons in hydraulic cylinders 210. The pinion is actuated by a rear steering actuator motor 215 that can be integral with or added on to a rotary rack and pinion housing. The rear steering actuator motor 215 turns a worm gear 220 that engages an input shaft 225 of the rack and pinion 205. The input shaft 225, in turn, actuates the pinion of the rack and pinion 205. In this way, fluid is forced out of one of the cylinders 210 and moves a respective piston in cylinders that actuate tie rods. A rear steering position sensor, such as a potentiometer connected to the pinion shaft or a magnetic position sensor in one of the hydraulic cylinders (not shown in FIG. 7), can sense the position of the steering. The rear steering position sensor 230 is operably associated with the other electric components of the system as shown in FIG. 8. A similar steering mechanism can be implemented on a front steering of a vehicle of the present invention.

FIG. 8 is block diagram showing various electrical and electronic components that can be implemented to a greater or lesser degree depending on the degree of automation desired. In the fully automated configuration, the frame(s) 20, 23, 34 and arm assemblies 25 are operably connected to an electronic control unit (ECU) 257. The ECU can be mounted anywhere on the frame(s) 20, 23, 34. Alternatively, the ECU can be mounted on the vehicle associated with suspension system. The ECU is operatively associated with the other electrical components for receiving feedback and sending control signals. For example the actuator motors 51 are connected to the processor via speed controllers 260. In this case, the actuator motors 51 can be speed controllable servomotors.

The motors 51 can thus be controlled by a predetermined protocol provided by circuitry or a program in the ECU. The protocol includes a set of logical steps and responses based on input from the various electrical components.

The ECU 257 is advantageously utilized to accomplish a first major function of automatically leaning the frame 20, 23, 34 and wheels 28 in accordance with a particular speed and turning angle of the vehicle 10. To this end, the vehicle 10 is provided with a speed sensor 263 operatively associated with the ECU. The speed sensor 263 can be a device that senses revolutions per minute at the front wheel or at a selected location in the drive train. Alternatively, the speed sensor 263 could be a sensor that detects ground speed. A front steering position sensor 266 is provided in the form of a magnetic sensor in the hydraulic rams or as a potentiometer on the shaft of a rotary rack and pinion steering system both of which are known. Signals from the speed sensor 263 and the front steering position sensor 266 are transmitted to the ECU. The ECU processes the signals and calculates a proper angle of lean. Then the ECU sends a signal to the motors 51 to actuate the arm assemblies 25 to provide the proper angle of lean. In this case, all of the arm assemblies 25 will tilt in a common plane relative to the frame(s) 20, 23, 34. All of the wheels 28 and the frame(s) 20, 23, 34 will be at the same angle relative to this common plane. The arm assemblies 25 can be stopped at the proper lean angle based on a particular metered number of rotations or pulses by the motor 51. Alternatively, the arm assemblies 25 can be stopped at the proper angle based on feedback from the outboard sensors 127. Further alternatively, the arm assemblies can be stopped at their proper angle based on a combination of metered input and feedback from sensors. Since the speed and angle of turn will generally vary continuously, the ECU 257 continuously receives signals, calculates an appropriate angle of lean, and actuates the motors via the speed controllers 260 in accordance with the predetermined protocol. Thus, the angle of lean is continuously adjusted.

Alternatively or additionally, one or more lean force sensors 269 are provided for sensing centrifugal and gravitational forces. The lean of the vehicle could be based exclusively on the feedback from a single lean force sensor 269 mounted inside the ECU housing, for example. Alternatively, a plurality of force sensors could be located at different positions in the vehicle, frame, and suspension. Feedback from such force sensors could be used to automatically balance the forces generally evenly or otherwise based on the predetermined protocol. The lean force sensors 269 could be used in addition to the speed and turning position sensors for redundancy and for additional feedback. It is to be understood that the feedback from the lean force sensors should be averaged over a sufficient period of time so as to not be significantly affected by changes in the contour of the driving surface.

Automatic adjustment of the angle of lean can be stopped by actuating a lean override switch 272 that is operatively associated with the ECU 257. Actuating the override switch 272 permits the angle of lean to be adjusted by the driver to a greater lean than the predetermined protocol provides, for example. Furthermore, the override switch 272 provides a safety feature in dealing with a power slide or other situations that commonly occur in riding. For example, when the automatic lean is a function of the turn angle, front counter steering in order to instantaneously pull out of a power slide could cause automatic lean in a direction radially outward relative to a curve being navigated. Such an automatic lean, in this case, is undesirable and could easily result in flipping the vehicle due to a shift in the center of gravity radially outward relative to the curve that is being navigated. Thus, to prevent this, a driver can actuate the lean override switch before counter steering the front steering during a power slide. The override switch can take any of a variety of forms including, but not limited to, a rotatable left grip or a finger or thumb actuated lever. When lean is based on feedback from lean force sensors 269, the need for a lean override may be eliminated since the system will attempt to balance the forces independent of front counter steering. However, the lean override feature may be included in a system with lean force sensors for additional control.

The lean override switch 272 can be configured with a single "off" and a single "on" position for allowing a driver to simply take over control of lean by shifting his or her own weight when the override switch is in the "on" position. Alternatively, the override switch 272 can be implemented with plural discrete "on" settings or as a rheostat switch for continuous adjustment over a range of motion in the switch 272. It is to be understood that the lean override switch 272 can be configured to stop the movement of the actuator to hold the lean of the vehicle at any attitude. In the case of an override switch 272 having more than one on position, the switch 272 could be configured to provide manual actuation of the actuator motors 51 via the override switch 272 in order to lean the frame(s) 20, 23, 34 and vehicle 10 as desired.

The ECU 257 is used to accomplish a second major function of absorbing shock by actually tracking a contour of the surface 30. To this end, signals from the inboard and outboard sensors 50, 127 are fed back to the ECU 257 and are there compared. If the inboard position sensor 50 registers a greater deflection angle than the outboard position sensor 127, then the ECU actuates the motor 51 to make the outboard angle equivalent to the inboard angle in accordance with the predetermined protocol. This occurs, for example, when one of the arm assemblies 25 is independently raised by a bump. In this case, compression of the shock absorber 48 is initiated. However, as soon as this deflection of the arm assembly 25 begins, the difference between the inboard angle and the outboard angle is detected and the arm assembly is actuated to the position that accommodates the bump. Because the feedback and actuation occurs very fast, the arm assembly is able to track up and over the bump with minimal compression of the shock absorber 48. Furthermore, a reduced amount of the load from the bump is transferred to the other side of the vehicle because the pertinent arm assembly has responsively moved up and over the bump. Once the bump has been passed, the arm assembly 25 immediately returns to the appropriate angle for a proper lean based on the current speed, and angle of turn or alternatively, based on the speed and angle of turn when the bump was first encountered. This shock absorption is provided by each of the arm assemblies 25 independently of each other. In this way, the frame and suspension system accomplishes both automatically leaning the frame(s) 20, 23, 34 and providing shock absorption by automatically tracking the contour of the surface 30 simultaneously.

It is to be understood that the outboard position sensors 127 could be eliminated altogether. The angle of the wheels 28 could be adjusted to coincide with an angle detected by the inboard sensor 50 when the arm assemblies 25 are moved to absorb a shock or to accommodate a bump in the contour of the driving surface 30.

It should be noted that this shock absorption by tracking is made possible in part by the speed capabilities of the motors 51. The motors 51 can be provided as servomotors that have an operating range of speeds from zero to approximately fifteen thousand revolutions per minute. At ten thousand revolutions per minute, twenty revolutions will only take a fraction of a second. With the present invention, it is also possible to move the arm assembly 25 through an angle of twenty-two and a half degrees in only a fraction of a second.

It is to be understood that the speed of the actuator will vary based on the speed at which a bump is encountered, for example. In this way, the actuator motor speed will be automatically controlled to properly mirror the contour of the driving surface 30. The rate of the motors 51 will be adjusted so that they do not jar or shake the suspension and driver badly at their adjusted rate. In one configuration, the actuator motor speed can be adjusted to mirror the spring mechanism. Alternatively, the actuator can be moved slightly slower than the spring compression rate of the shock absorbers 48 to allow movement of the suspension and accompanying feedback on which to base continuing adjustment. Furthermore, the rate may be varied over the course of a single actuation to "ease" the abruptness of stopping and starting a particular shock absorbing motion.

It should be further noted that the shock absorbers are needed to provide "feed forward" or to permit the initial difference between the outboard angle and the inboard angle. Another way to express what occurs during the tracking type of shock absorption is that the angle between the hub assembly 42 and the lower arm 35 reflects the proper angle of lean to accommodate a specific angle of turn at a specific speed in accordance with the predetermined protocol. When the angle between the lower arm and the frame(s) 20, 23, 34 becomes greater than or less than the outboard angle, then the actuators move the actuator arm 54 and the associated parallelogram structure including the hub assembly 42 and the upper control arm 36 to match the inboard angle. Because of the parallelogram aspect of the arm assembly structure, the hub assembly 42 is automatically placed at the same angle as the inboard angle relative to the lower arm 35. As can be appreciated, the shock absorbers 48 are also important once the arm assembly 25 has reached an extreme in its range of motion. For example, when further relative motion between the lower arm 35, upper control arm 36, and actuation arm 54 is physically limited, the shock absorber 48 can provide the needed deflection and shock absorption.

It should be further noted that the position of the shock absorbers 48 can be changed without departing from the spirit and scope of the invention. For example, the upper control arm 36 can be configured to connect to a pair of actuator arms 54 instead of at a pair of opposite outside positions shown in FIGS. 2A and 3A. With this configuration, a pair of shock absorbers 48 can be placed on opposite outside positions instead of between the pair of actuator arms as shown in FIG. 2A. This double shock absorber arrangement would be of particular benefit with heavier vehicles may have larger and heavier frames. Another alternative arrangement for the shock absorbers is to provide the shock absorbers inside the frame.

Still further it should be noted that a vehicle incorporating the mechanisms of the present invention may further include an automatically adjustable shock absorber system to compensate for off balance loads within the vehicle. For example, if the vehicle is loaded more on the left than on the right, the system would adjust by increasing the gas pressure in the shock absorbers on the left of the vehicle.

The above described tracking functions can further alternatively be provided by a more sophisticated forward looking system for mapping a contour of the driving surface. Thus, the predetermined protocol could be configured to provide a pre-absorption of the shock of a bump, for example, by raising the wheels 28 just before they reach the bump.

It should be further noted that the frame and suspension system of the present invention is intended, at least in some cases, to provide a suspension on a suspension. This is the case, for example, for a motorcycle body supported on frames 20, 23. In this case, conventional motorcycle shock absorbers are retained on the steering forks and on the rear swing arm frame 23. Thus, the motorcycle and driver 5 benefit from a non-conventional suspension on top of a suspension for an even smoother ride.

Rear steering can be implemented with any of the embodiments of the present invention. Rear steering capability is particularly beneficial in racing and other special applications. To this end, a rear steering position sensor can be operatively associated with the ECU. The rear steering actuator motor 215 is also operatively associated with and controlled by the ECU in accordance with the predetermined protocol. As with the other actuators set forth above, the rear steering actuator can be connected to the ECU by a speed controller 275. In this way, the speed of the rear steering motor and the position of the rear steering angle can be controlled automatically. The predetermined protocol can be configured to operate the rear steering mechanism by running the rear steering actuation motor 215 a set numbers of rotations or pulses, moving the rear steering actuator in accordance with feedback from the rear steering position sensor 230, or a combination of both. It is to be understood that the angle of turn for the rear steering can be in the same direction as the front steering and at a percentage of the front steering position. Although most applications call for the rear wheels to be turned only a small percentage of the front turn angle, it is possible to provide the rear turn angle at as much as one hundred percent of the front steering turn angle.

It is to be understood that the front steering position sensor 266 could be provided as a gyroscopic sensor or sensors that sense a change in the angle of lean of the vehicle by use of a gyroscope. In fact, an additional sensor or sensors could be provided in combination with the front steering sensor 266, or as a separate gyroscope for detecting attitude changes. Providing an attitude sensor in this way has the advantage of providing the system with a reference point. This could be particularly important when the driving surface is extremely steep, and especially when the slope is in a side-to-side direction. In this case, the attitude sensor could actually provide feedback to enable the processor to maintain the frame and vehicle in an upright position when traveling in a straight line on a side-to-side inclined surface. This upright position could function as a reference orientation. Gyroscopes and sensors for this purpose can be mounted anywhere on the vehicle or frame 20, 23, 34. The gyroscopes may be of the silicon type and be packaged with the ECU.

It is to be further understood that force sensors 281, 284 could be included in the front steering mechanism and operatively associated, with the ECU 257. The protocol controls an actuator in the hydraulic steering to decrease a flow of hydraulic fluid with increasing speed to provide a proper feel to the driver. As the required force increases due to restricted fluid flow, the force sensors detect the increased forces applied by the driver. Feedback from the force sensors 281, 284 is thus provided to the ECU, which in turn can effectuate an alternative or additional lean of the wheels 28. This aspect of the invention is considered to be particularly beneficial in applications in which the vehicle is a car.

The actuators, ECU, and other electrical components require a power source 287. It is contemplated that this power source could include a variety of batteries and capacitors to take advantage of the particular characteristics of each battery type and the capacitor. For example, in applications in which the vehicle is a human powered vehicle, such as a bicycle, the power source could include nickel zinc batteries, lead acid batteries, and a capacitor in line with the batteries. The power source could be rechargeable, including recharging by regeneration.

Another convenient and useful aspect of the invention is the counter steering feature in which the rear steering is automatically turned in an opposite direction from the front steering. This enables a driver to make very tight turns and is typically utilized at low speeds. In the present invention, rear counter steering is actuated by pressing a momentary switch 278 that is operatively associated with the ECU. That is, the switch must be held in an "on" position for as long as the rear counter steering feature is being implemented. When the momentary switch is held in the "on" position, the ECU automatically sends signals to the rear steering actuator 215 via the rear steering speed controller 275 to steer the rear wheels in an opposite direction relative to the front wheels in accordance with the predetermined protocol. Once again, the angle of turn of the rear counter steering is a percentage of the front steering angle, and can be selected between zero and one hundred percent. When the switch is released, the feature is automatically turned off and the rear steering automatically reverts to that provided by the predetermined protocol without the momentary switch being actuated.

It is to be understood that the automatic rear steering and counter steering can be provided as a function of the speed in the protocol. The exception is when the override switch is actuated, in which case the rear steering becomes a function of the lean.

It is to be further understood that the predetermined protocol can be adjusted or can include settings that can be selected. For example, it is possible to adjust the protocol or select a setting that turns "off" automatic rear steering. Furthermore, the protocol can be configured to provide the function of absorbing shock by automatically tracking a contour as discussed above, but to not provide the automatic lean adjustment. Automatic lean adjustment is particularly beneficial in applications having a low center of gravity because it is more difficult for a driver to effect lean by shifting his or her body weight. However, the automatic lean feature can be incorporated in applications having high centers of gravity, such as with motorcycle having upright seating configurations. Advantageously, the present invention can be implemented with vehicles having any of a variety of occupant supporting configurations including, but not limited to, recumbent, prone, and kneeling.

FIGS. 1A and 1B show active system actuators that may be run by electric motors or mechanical mechanisms as has been described in the previous U.S. patent application Ser. No. 10/428,274, now U.S. Pat. No. 6,805,362, and U.S. patent application Ser. No. 10/695,377, now U.S. Pat. No. 7,131,650, both by the same inventor as this application, and to which this application claims priority. Furthermore, many of the same concepts may be applied in passive or active systems as set forth in the present application without departing from the spirit and scope of the original invention.

It is further to be understood that the cam shown in FIG. 4F can be replaced by any appropriate eccentric of any of a variety of shapes including a circular eccentric. The embodiment of FIG. 4F may also be used in place of an embodiment having the actuation cylinder 143 coupled to the frame 20, 23, 34 and to one of the arms 35.

As set forth above, the solenoid valve can be selectively activated to stop the flow and maintain the suspensions in their current position. This feature could be particularly advantageous, for example, when parking the vehicle or when the vehicle is in a leaned state on the side of a hill. Thus, the solenoid valve could be activated to prevent inadvertent leaning of the vehicle. In one embodiment, the solenoid may only be activated when the vehicle is in a slow or stopped state for parking on a hillside or on level ground.

Figure 9A:
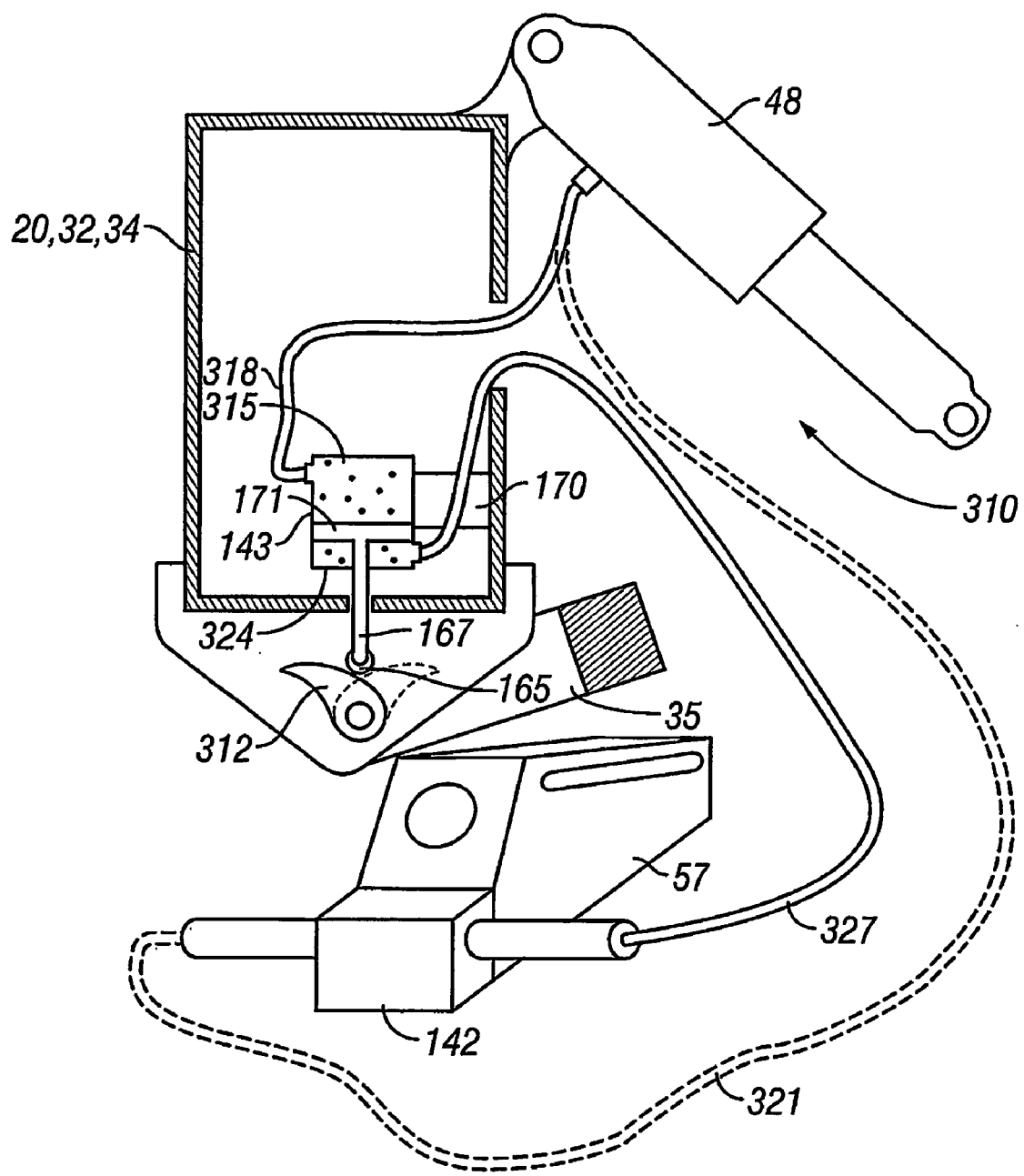
FIG. 9A is a sectional view similar to FIG. 4G and including a connection to a shock absorber.

The embodiment of FIGS. 9A-9B and 10-11A has a shock absorber fluid/gas adjusting mechanism 310 that utilizes the shock absorber 48 of a respective arm assembly 25 to at least partially control actuation of the arm assemblies. The shock absorbing mechanism is configured to convert a substantially progressive shock absorber 48 into a generally linear shock absorber. This may be accomplished by transferring a fluid, such as air, from the shock absorber 48 and into the actuation cylinder 143 when the arm assembly is rotated upwardly as shown in FIG. 9A. In this condition, a volume of air is drawn out of the shock absorber causing the shock absorber to become more progressive in spring stiffness. At the same time, the relationship of the frame relative to the arm assembly 25 provides a mechanical advantage in compressing the shock absorber. The gain in mechanical advantage may be matched to the increase in stiffness over the range of motion of the arm assembly 25 and shock absorber 48, so that the shock absorber may become more or less linear in its resistance throughout a large range of motion of the arm assembly. By this relationship and configuration, a relatively short shock absorber, (in a range from four to nine inches in length, for example), may be used to provide generally linear force resistance for an arm assembly that has thirty inches of travel at its outboard end.

As shown, a cam member 312 of a different shape may be implemented to engage a cam follower 165 connected to the piston 171. When the lower arm 35 is lowered, the cam member 312 will press the piston up forcing a fluid 315 through the first shock absorber fluid line 318. As may be appreciated, the shock absorber 48 may be an air shock, and may therefore adjustably receive air therein. The air cylinder of the shock absorber 48 is analogous to the reservoir 174 described above, since it adjustably receives a fluid. As may be appreciated, the shock absorber and/or the actuation cylinder 143 may include adjustable control valves to provide restriction of flow in at least one direction. Furthermore, the shock absorber 48 and/or the actuation cylinder 143 may also include inertia valves for controlling flow of the air under braking and acceleration conditions as will be described in greater detail below.

Figure 9B:
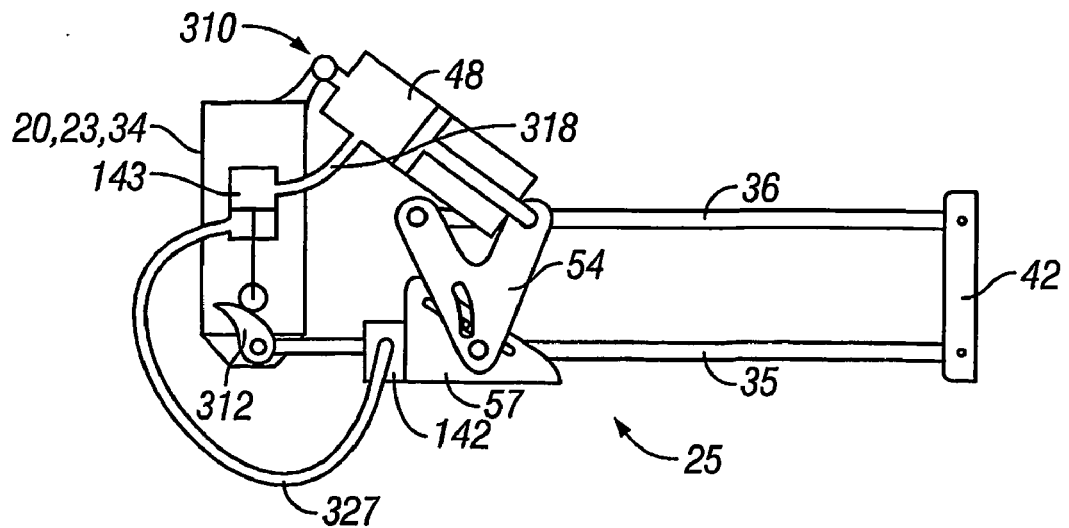
FIG. 9B is a diagrammatic end view similar to FIG. 9A showing fluid connections alternatively connected between the actuator and the fluid transfer device and between the actuator, fluid connection device, and the shock absorber.

The embodiment of FIGS. 9A-9B may alternatively route a shock absorber fluid line 321 from an opposite side of the rack and pinion mechanism 142 to the shock absorber 48 as shown in dashed lines. Thus, when the lower arm 35 is moved upward into the position shown in FIG. 9A, a cam member 312 of opposite orientation shown in dashed lines will force the piston 171 upwardly drawing fluid 324 through a second actuator line 327. This in turn may draw air from the shock absorber through the shock absorber line 321 to accomplish the same purpose of changing the volume of air in the shock absorber 48 and making it more stiff as a mechanical advantage is gained and less stiff as a mechanical advantage is lost during travel of the arm assembly 25.

FIG. 9B is a schematic end view showing the relationship of the upper control arm 36, the lower arm 35, the actuator arm 54, hub assembly 42, frame 20, 23, 34, actuation cylinder 143, cam 312, and respective lines between the actuator 57, actuation cylinder 143, and the shock absorber 48. The configuration of FIG. 9B may be applied to each of the arm assemblies 25 of the vehicle so that each is advantageously actuated and controlled as described with regard to the arm assembly shown in FIG. 9B.

Figure 9C:
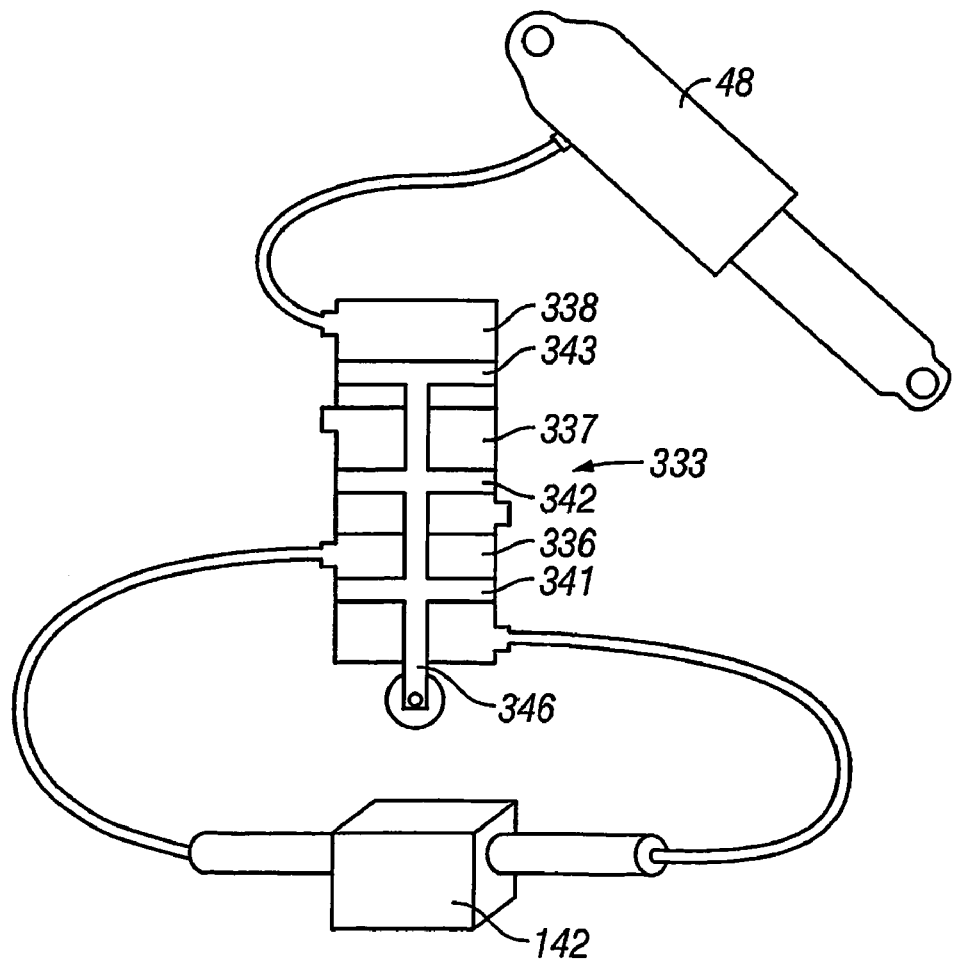
FIG. 9C shows the actuation cylinder replaced by a multi-chambered or stacked actuation cylinder.

FIG. 9C shows another alternative embodiment that functions similar to that of FIGS. 9A and 9B. In the embodiment of FIG. 9C, the actuation cylinder 143 may be replaced by a multi-chambered or stacked actuation cylinder 333. The stacked actuation cylinder 333 may have three chambers 336, 337, and 338 containing incompressible fluids in the first and second chambers 336 and 337, and a compressible fluid in the third chamber 338, for example. These fluids may be actuated by pistons 341, 342, and 343 having a common shaft 346. The first and second chambers may form a circuit with opposite sides of the rack and pinion 142. Thus, the force acting on the piston in the actuation cylinder may be greater than if only one side of the rack and pinion were connected to a chamber on just one side of the piston. At the same time, a volume of gas such as air may be sent from or drawn into the third chamber 338 by the piston 343 in unison with movement of the other pistons 341 and 342. In this way, the actuation cylinder 333 may function similarly to the actuation cylinder 143 described above. It is to be understood that the stacked actuation cylinder may have any number of chambers for connection with additional elements. Furthermore, it is possible to utilize any of a variety of compressible or incompressible fluids.

Figure 10:
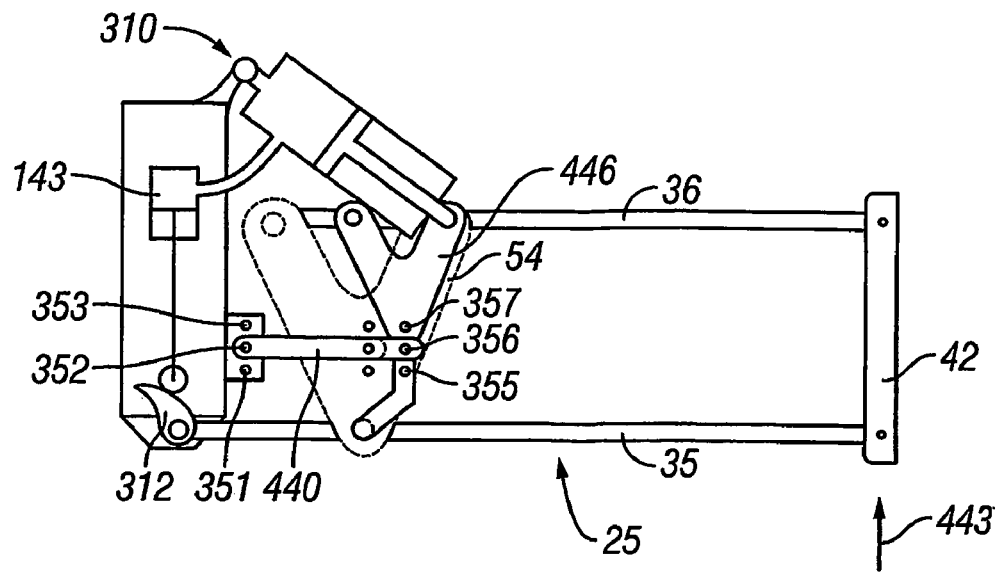
FIG. 10 is a diagrammatic end view similar to FIG. 9B showing an alternative embodiment having a mechanical link between the frame and the actuator arm.

FIG. 10 shows a schematic end view of another embodiment of a drive mechanism. In this embodiment, a mechanical link 440 may be provided as a rigid member that is generally incompressible and cannot be stretched. When an upward force 443 is exerted by the ground through a wheel on the hub assembly 42, the lower arm 35 will be urged to pivot upwardly about an inboard end thereof that is pivotally connected to the frame 20, 23, 34. However, the mechanical link 440 will resist upward movement of the lower arm 35 unless an actuator arm 446 collapses toward the lower arm. It is to be understood that the actuator arm 446 may replace the actuator arm 54 described above and shown in dashed lines in FIG. 10. Either actuation arm 54, 446 forms a parallelogram with the upper control arm 36, the lower arm 35, and the hub assembly 42. In any case, the actuator arm 54, 446 may controllably resist collapse by connection to the mechanical shock absorber 48. The shock absorber 48 may be configured to be a linear shock absorber as by adjustment of the air volume therein similar to the embodiments of FIGS. 9A-9C above. Thus, as shown, when the arm assembly 25 is rotated upwardly and toward the frame 20, 23, 34, a volume of air is transferred out of the shock absorber 48, the shock absorber becomes shorter and stiffer. At the same time, a mechanical advantage is increased by increased lean which places the rider/driver's center of gravity further outboard. Thus, a balance may be achieved between the increased mechanical advantage of the rider/driver's lean and the increasing stiffness of the shock absorber.

It is to be understood that the mechanical member 440 may be in tension or compression at any moment in time. However, it is to be understood that the positioning of the mechanical link 440 as shown in FIG. 10 places an effective fulcrum closer to the pivot connection of the lower arm to the frame than in a standard swing arm suspension. As shown, the frame may have three vertically aligned mounting holes 351, 352, 353 to which an inboard end of the mechanical link 440 may be pivotally mounted. The actuator arms 54, 446 also have three vertically aligned holes 355, 356, 357 to which an outboard end of the mechanical link 440 may be pivotally mounted. These holes are vertically aligned when the arm assembly 25 is in the upright configuration, and the mechanical link 440 may be selectively placed in any of upper, middle or lower pairs of the corresponding holes to advantageously adjust the effective fulcrum position of the rider/driver's mechanical advantage. In this way, the mechanical link becomes part of the actuator for this embodiment. In particular, the actuator for this embodiment may include the actuation of the cylinder 143 and the cam member 312 for driving the actuation cylinder, the fluid/gas adjusting mechanism 310 that varies the volume of the fluid/gas in the shock absorber and helps to control the actuator arm, the mechanical link 440 that helps to control the actuator arm, and the actuator arm 54, 446. These elements work together to provide a drive mechanism that permits controlled leaning and alignment of the arm assembly 25.

As shown in FIG. 10, the actuator arm 54,446, the hub assembly 42, the upper control arm 36, and the lower arm 35 have pivotal connections with each other that form a first parallelogram. The frame 20, 23,34, the actuator arm 54,446, the mechanical link 440, and a portion of the lower arm 35 form a second parallelogram. This second parallelogram provides an effective fulcrum that may be selectively adjusted by positioning the mechanical link in selected pairs of the holes 351, 352, 353 and 355, 356, 357.

It is to be understood that two, three, or more arm assemblies 25 may be provided on a frame to advantageously provide the controlled leaning and alignment of a vehicle and rider/driver supported on the frame and resulting suspension. It is to be understood that in this passive system, the brain and muscles of the rider/driver replace the ECU and motors of the active system. That is, the driver senses when and how much to lean. By knowing his speed, the angle of his turn, and the contour of the terrain, the driver can intuitively and logically determine how much and when to lean. This actuates the actuator and its associated drive mechanism, which in turn provides a controlled lean and alignment system in accordance with the present invention.

In the mechanically controlled systems, the actuator includes an actuator arm 54, 446 pivotally connected to the inboard end of the upper control arm 36. The actuator arm 54,446 may be pivotally connected to the inboard end of the lower arm 35. A mechanical drive mechanism, forming at least a portion of the actuator, is motively connected to the actuator arm to move the actuator arm through a range of motion in a controlled manner. The mechanical feedback mechanisms comprise respective position indicating cams (160 or 312) operably associated with the respective arm assemblies for automatically controlling the mechanical drive mechanism and the actuator arm in each arm assembly.

Figure 11A:
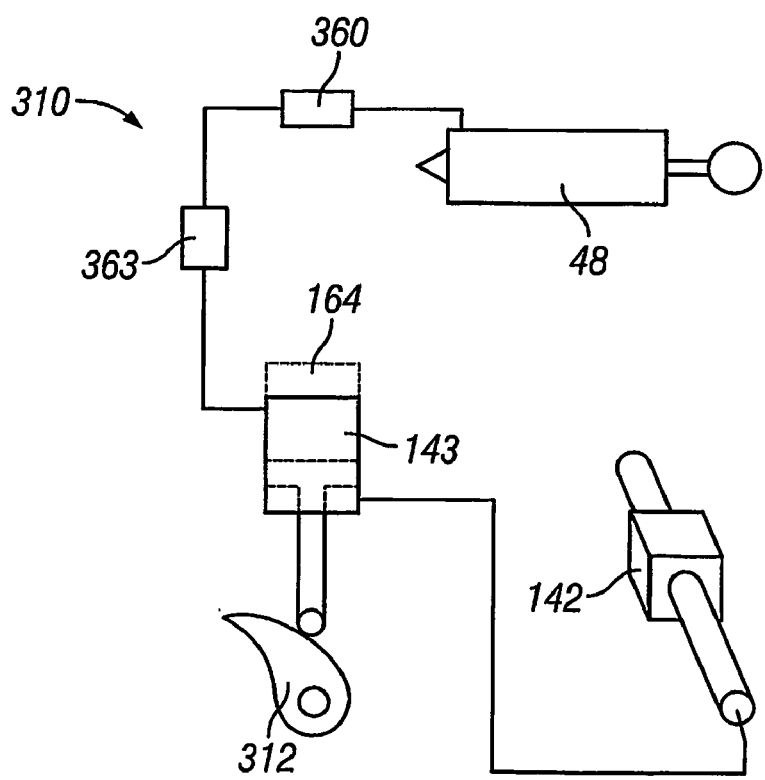
FIGS. 11A and 11B are schematic views of fluid connections between actuation mechanisms, hydraulic cylinders, and/or shock absorbers.

FIG. 11A is a schematic view of the fluid/gas adjusting mechanism including the actuation cylinder 143 and the shock absorber 48. As set forth above, this shock absorber fluid/gas adjusting mechanism 310 may be used in conjunction with a rack and pinion 142 or other drive mechanism. FIG. 11A also shows a control valve 360 and an inertia valve 363 in a fluid/gas line between the actuation cylinder 143 and the shock absorber 48. The control valve may control flow of the fluid/gas in one direction, while permitting free flow in the other direction. In particular, respective control valves may be placed in each line between an actuation cylinder 143 and a shock absorber 48 for each of the arm assemblies so that the control valves permit free flow during extension of the shock absorbers 48, but limit flow during contraction of the shock absorbers. The restriction of the flow may be adjusted so that compression of the shock absorbers may be at a greater or lesser rate as desired. In this way, the shock absorbers 48 may be adjusted to meet the needs of a particular vehicle and rider/driver.

The inertia valve 363 may also be placed in the line between the actuation cylinder 143 and the shock absorber 48. This inertia valve 363 may be aligned with a travel direction of the vehicle such as by being aligned with a longitudinal axis of a chassis, for example. This inertia valve may be capable of actuation in one direction. For example, on the forward arm assemblies, the inertia valve 363 would be oriented to respond when a driver applies the brakes, in which case the inertia valve would close off the line and back up pressure so that the shock absorber becomes stiff and prevents inordinate nose dive of the vehicle. Alternatively expressed, the inertia valve interrupts the fluid/gas adjusting mechanism 310 and converts the shock absorber 48 back into a more progressive shock during braking or other rapid deceleration. Similarly, the system may include inertia valves 363 in the rear arm assemblies aligned with a direction of travel to close off the lines between the actuation cylinders 143 and the shock absorbers 48 during acceleration to inhibit inordinate dipping of a rear end of the vehicle during acceleration. It is to be understood that force sensors may be placed at a variety of sprung and unsprung positions to determine chassis position and jounce. In another respect, the system may have any of a variety of position sensors as indicated by element 164 in FIG. 11A to detect a position of the piston within the cylinder 143 and feed this position back to an ECU to compare and adjust positions as needed.

Alternative mechanisms have been developed for actuating arm assemblies in accordance with the present invention. These mechanisms are described and shown at length in the copending U.S. provisional patent application Ser. No. 60/555,425 filed Mar. 22, 2004, entitled "VEHICLE LEAN AND ALIGNMENT CONTROL SYSTEMS, SUSPENSIONS, ACTUATORS THEREFORE, AND VEHICLES INCORPORATING THE SAME", to which this application claims priority for any new details not previously filed by the same inventor, Wes Melcher, as this application. The material of U.S. provisional patent application Ser. No. 60/555,425 is incorporated herein by reference. The alternative mechanisms for actuating have respective advantages including manufacturing and material cost savings, as well as providing increased simplicity, as may be appreciated from the following paragraphs.

Embodied in these alternatives are various ways of rotating the actuator arms described here and in the parent applications. Several aspects of the present inventions are considered to be common to at least some of the embodiments of the parent applications. The common aspects include, but are not limited to, four basic elements. First, the actuator arms may be rotatively connected to the lower arm of the suspension. Second, the upper control arm may be rotatively connected to the actuator arm in the suspension. Third, the shock absorber that supports the chassis may be rotatively connected to the actuator arms. Fourth, the lower arm may be rotatively connected to the chassis. These four common aspects provide an arcing rotative movement of the suspension relative to the frame or chassis. Furthermore, particular structures and mechanisms that are employed to provide these aspects have their respective advantages.

As set forth in the above referenced applications, the actuators 39 may be actuated by motors 51 that drive respective lead screws 81 of the actuators, for the embodiment of FIG. 3B. Alternatively, the actuators 39 may be actuated by fluidly driven rams that move racks, which in turn rotate pinions that move the lead screws 81, for the embodiment of FIG. 4B.

Further alternatively, an actuator could be moved directly by fluid and incorporate a fluid ram connected to one of the arms of the arm assembly 25 and to the actuator arm. This arrangement requires a relatively large space in which to dispose the fluid ram when the fluid ram is a hydraulic ram of a size typically available on the market today. Thus, this arrangement may be particularly useful on larger vehicles with larger suspensions. However, it is contemplated that the fluid ram may be of a smaller size and may be a hydraulic or a pneumatic ram.

Figure 11B:
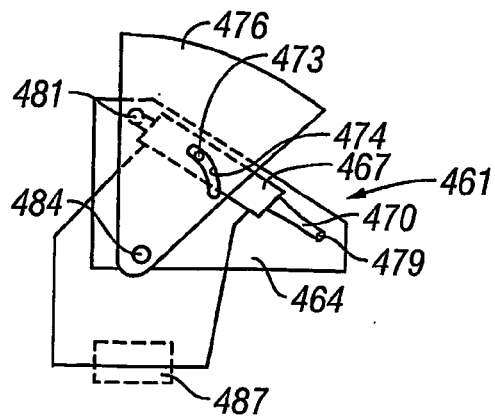
Figure 11C:
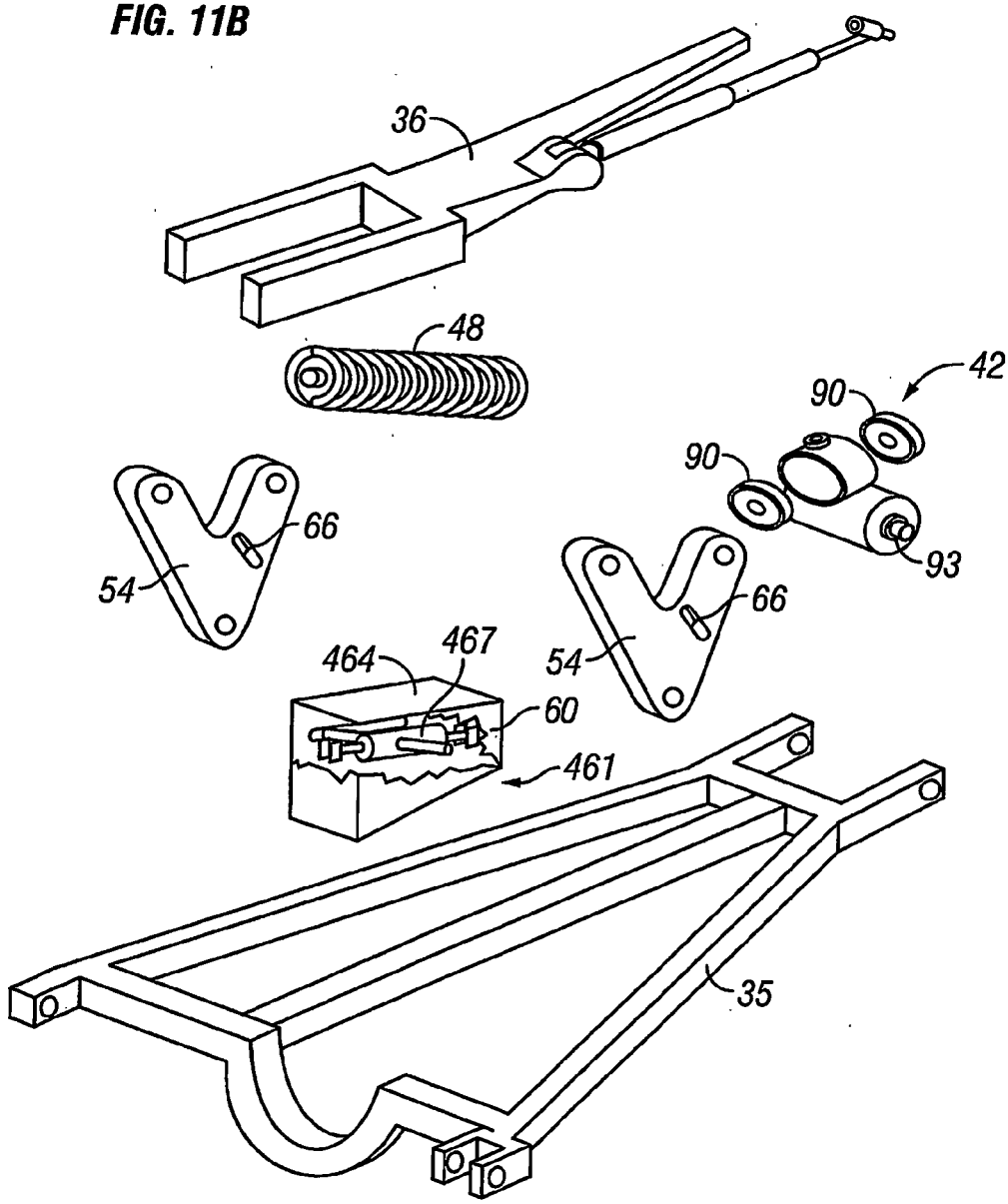
FIG. 11C is an exploded perspective view of an arm assembly similar to that of FIG. 3B according to another embodiment of the invention.

A more compact embodiment is shown in FIGS. 11B and 11C, in which a fluid ram 461 is generally supported in an actuator housing 464 having a cradle configuration. In this embodiment, a ram cylinder 467 may be forced in first or second directions along a piston rod 470. Pins 473 may extend from the cylinder and into slots 474 in actuator arms 476 analogous to the actuator arms 54, 446 described above. The slots 474 that are angled to provide a desired rotational motion based on the linear movement of the pins 473 during actuation of the fluid ram 461, as has been shown and described above. To provide stable linear motion, the ends of the rod 470 may be fixed on opposite ends 479, 481 to the actuator housing 464. As shown, the actuator arms 476 may be rotatably connected to the actuator housing 464 at pivot points 484. The actuator housing 464 may be fixed to any of the lower or upper arms of the suspensions of the present invention.

Additional features could be applied separately or as part of any of the embodiments of the present invention. In particular, a hydraulic or other fluid ram may be supported by a sturdy plate formed of steel or another strong material. This plate may, in turn, be supported in an actuator housing. The fluid ram in this and other embodiments of the present invention may be held in respective housings by a split clamp or the like. The plate may have a pair of arms that extend longitudinally along opposite sides of the fluid ram. The plate may have an end cap or end plate that is formed integrally or added on and connects the arms of the plate together. The end cap or end plate can have an opening therethrough for slidably supporting a portion of the fluid ram. A positive stop may be formed by a shoulder engaging on the end cap. This shoulder may be integral with the fluid ram or may be added on. For example, the shoulder may be formed by a contour in the fluid ram cylinder. Alternatively, the shoulder may be a lower edge of a lifting block that may be fixed to an outer surface of the cylinder.

The lifting block may include a pin supporting portion having pins fixed thereto and extending outwardly therefrom. The pins may thus engage in elongate slots in the respective opposite actuator arms. Thus, the lifting block may be guided along the arms when the fluid cylinder is actuated. Furthermore, the plate arms and the end cap or end plate may form a lifting sleeve that may be fixed relative to the actuator housing. The shaft or rod of the fluid ram may also be held in fixed relation to the actuator housing such as by a steel plate and nut, for example. Thus, actuation of the fluid cylinder may move the lifting block within the lifting sleeve.

As may be appreciated, while the arms of the sleeve are rigid and strong in their fixed condition, they are also somewhat flexible in their non-fixed condition for permitting separation during placement of the fluid ram within the lifting sleeve, or removal of the fluid ram, for example. It is to be understood that end plates may be integrally formed with the plate arms respectively. These end plates may extend transversely inward to overlie each other and the plate for secure mounting of the lifting sleeve, such as by clamping with a nut, for example. It is also to be understood that the end cap or end plate may include or support a bearing or bushing for slidably supporting the fluid ram in the lifting sleeve.

Hydraulic or other fluid lines may supply fluid under pressure to the fluid ram to actuate it in either direction. However, it is to be noted that the cylinder may be caused to move relative to the lift sleeve. This arrangement allows for a much more compact fluid actuation device in which the fluid ram can basically take the place of the lead screw of the actuator of FIG. 3B. This actuation system permits the fluid ram to not only functionally replace the lead screw, but to also be positioned generally similarly to the lead screws of the previously disclosed embodiments. In this way, the cost of the actuator can be cut drastically. Notably, a complexly machined housing need not be provided as is required in the embodiments employing lead screw actuation. Rather, the housing may be provided in part by the lift sleeve. The rest of the housing could be provided by channel material or other off the shelf structural members. The fluid ram could be provided as an off the shelf component as well. It is to be understood that a complexly machined actuator housing need not be provided for this embodiment, as would typically be required in the embodiments employing lead screw actuation. Depending upon the size of the suspension to be actuated, special actuators could be used in conjunction with special hydraulic pumps 487 to drive the fluid rams. These pumps may be very small hydraulic pumps. Alternatively, the hydraulic ram could be actuated manually under the force of a rider/driver's lean. The gear ratios could be adjusted to enable such a manually actuated system.

In another embodiment of an actuator, a ram cylinder may be held stationary in the housing. The shaft and a slidable lifting block may be moved upon actuation of the actuator. The actuator may still actuate the actuator arms similar to the embodiments described above, and the actuator arms would have slots for receiving pins or ears similar to the previously described embodiments. However, the slidable lifting block may be fixedly connected to the shaft by lifting bolts, for example. The lifting bolts and the slidable lifting block may form a slidable lifting sleeve that at least partially overlies and slides upon an outer surface of the ram cylinder. The slidable lifting block may also include a self lubricating sleeve with shoulders or other structure for holding the sleeve in place with regard to the rest of the slidable lifting block. This arrangement advantageously provides a compact actuating mechanism for the actuator.

It is to be understood that the above described embodiments, as well as those incorporated herein by reference, could be made and used with one or more of each of the actuators, shock absorbers and actuator arms. For example, an actuator may include two shock absorbers and one fluid ram. Alternatively, the actuator could include two fluid rams and a single actuator arm. Any combination of numbers of these components may be implemented without departing from the spirit and scope of the invention.

As described above with regard to FIG. 4G, the safety and shock absorption features may only be needed on the high pressure side or portion of the fluid system that sends fluid 172 to the fluid driven rack and pinion 142 as the lower arm is moved in a direction of the arrow 190 toward the frame 20, 23, 34. On the other hand, similar safety and shock absorption features including the fluid reservoir 174 and the pressure control valve 178 may be similarly provided in the fourth line 184 for redundancy and to enable the system to remain in equilibrium at different adjusted fluid pressures. Since the volume of fluid 172 is constant, raising and lowering the volume on the high pressure side would require a similarly capable arrangement on the low pressure side to permit the system to remain in equilibrium at different adjusted reservoir spring pressures. The take up and pay out of excess fluid on the low pressure side could be provided by a similar fluid reservoir 174 or another device in the fourth fluid line 184. Likewise, the pressure control valve 178 could be provided for releasing pressure that is transferred through the rack and pinion 142, for example. Thus, the components in the low pressure side fourth line 184 could mirror the components in the first, second, and third lines 173, 177, and 182.

In order to control the pressure of spring 175 automatically, a multiple chamber cylinder device 510 (shown in a separate function in FIG. 11D) could be placed in line with both lines 173 and 184 that extend from the actuation cylinder 143. The air cylinders of the device could be connected to the respective lines 173 and 184 to increase or decrease the pressure of the incompressible fluid 172 therein by way of varying an air pressure in associated air cylinders. Thus, the device 510 can function similarly to the two reservoir system described above. Alternatively, air lines could be connected to the device 510 and to the air side of the reservoirs 174 to automatically increase or decrease the air pressure and the stiffness of the springs 175 in the reservoirs in accordance with particular driving conditions.

It is to be understood that the reservoir 174 and the pressure control valve 178 may be provided as a single integral unit. Furthermore, these components could be built into the hydraulics of a particular system. For example, a fluid ram could have one or more of these components integral with a cylinder or integral with a support for the cylinder. Alternatively, one or both of the reservoir 174 and the pressure control valve could be provided as part of the motor and pump assembly of an actively controlled hydraulic system.

Figure 11D:
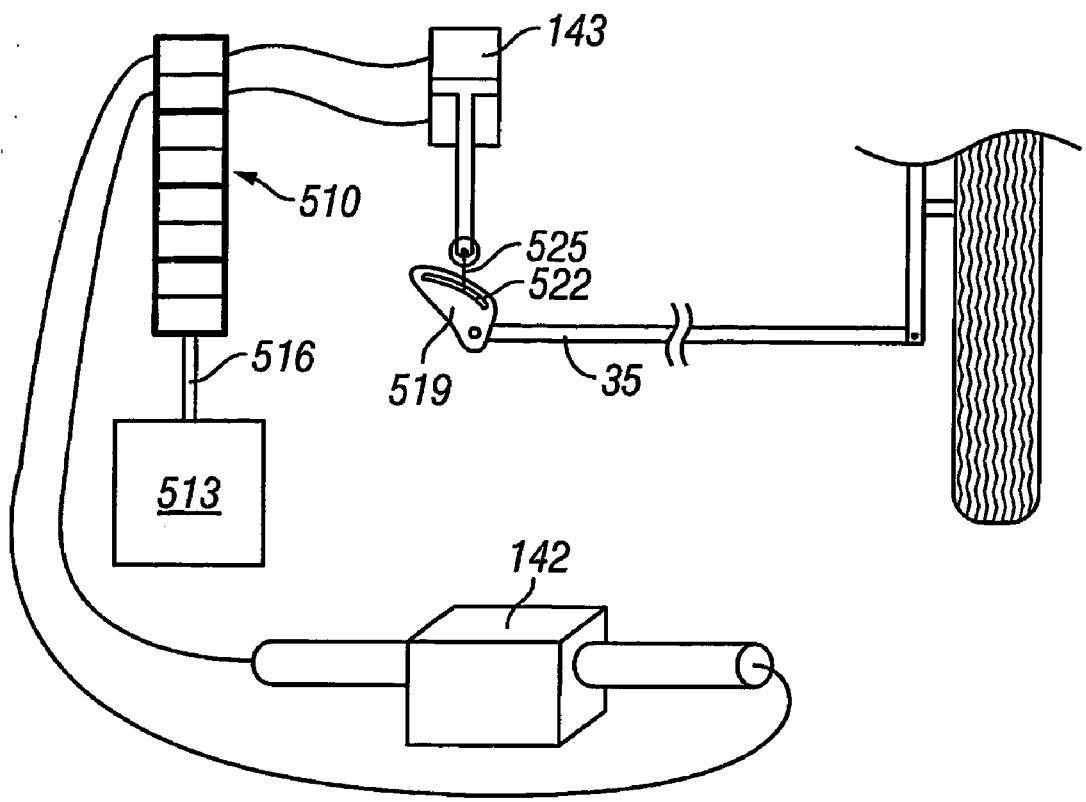
FIG. 11D is a schematic view of alternative fluid connections.

In FIG. 11D, the multiple chamber cylinder 510 is shown connected to the actuation cylinder 143. Since a vehicle will typically include two or more arm assemblies with respective actuation cylinders, it is to be understood that an active system, or a combination active system and passive system could include a multiple chamber cylinder 510 in which actuation cylinders 143 are connected to respective chambers in the cylinder. A motor 513 could be operated in accordance with feedback from an ECU to move a shaft 516 out and in to draw in or pay out fluid from the lines to compensate for expansion and contraction that may occur with rise and fall in temperatures. Thus, all of the arm assemblies may be adjusted at once by the motor 513 and the multiple chamber cylinder 510. The overall system may operate under an active control system to control lean and maintain attitude based on speed and angle of turn, while the separate cammed cylinders may operate independently to accommodate jounce. A cam member 519 may have a slot 522 that is engaged by a link 525 from the cam follower to prevent inadvertent separation thereof during actuation of the multiple cylinder device 510. Any embodiment, including the hydraulic actuation embodiments, may incorporate a variety of sensors that are set to detect any mismatch in position of the various components of the system. The ECU may be configured to make adjustments for such mismatches in the case of changes due to expansion of the fluid, for example.

In particular, it is contemplated that the multiple power air cylinder device 510 could thus be advantageously used for applications such as in cars in which the suspensions must be controlled due to the suspensions not being pivotally mounted on a single center line. That is, when the suspensions are pivotally mounted outboard of the central axis of the vehicle, leaning as applied to central axis mounted suspensions will tend to lean the chassis out of a curve, instead of in. Therefore, an actively controlled system is needed instead of the passive system that may otherwise be provided. In the actively controlled system, the lean must be controlled based on one or more of the vehicle speed, braking, angle of turn, and feedback from a gyroscopic sensor. To this end, the attitude of the suspensions and the lean may be controlled by providing the motor 513 to control and adjust the air pressure in respective cylinders of the multiple cylinder device 510. This control and adjustment could provide the desired attitude and lean based on the speed, angle of turn, braking, and/or feedback from a gyroscopic sensor. The motor could be controlled by an electronic control unit that is configured to provide predetermined pressures in the reservoirs 174 and resultant attitudes of suspensions based on driving conditions. Alternatively, one or more motor(s) could be configured to directly drive a rack and pinion or other input to the actuators. For example, a pump could also be used to directly transfer hydraulic fluid between the separate fluid sides of a hydraulic actuator. Thus, the present invention can be advantageously applied in vehicles having chassis of standard or other width, in which mounting of the lower control arm on a central axis is not practical. In these cases, the control systems whether electronic, mechanical, or electromechanical may be configured to provide the desired suspension attitudes and overall vehicle lean based on the specific driving conditions.

It is to be understood that the steering of a vehicle of the present invention could be provided as an electric over hydraulic system in which there is no mechanical connection between controls and the turning wheel(s). This type of system may be referred to as a fly-by-wire system, and has certain advantages including weight savings.

It is to be further understood that the reservoir may not be needed in some embodiments. In cases in which small size and low weight is desired, one of the more compact embodiments described above could be implemented. Furthermore, the reservoirs 174 may be eliminated. Removing the reservoirs also has the advantage of reducing feedback movement of the actuator arms during a period of readjustment of the reservoir springs after jarring, for example.

Figure 12:
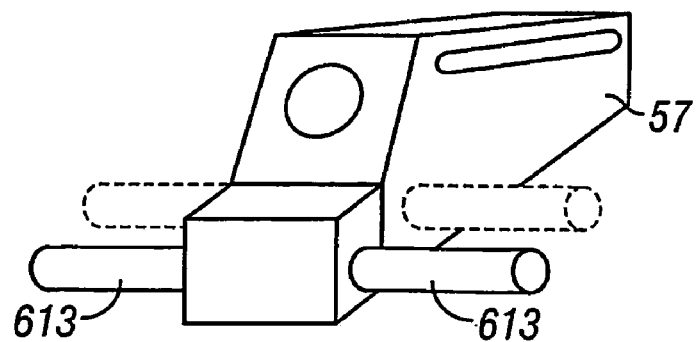
FIG. 12 is a perspective view of an alternative actuator.

In the actively controlled embodiments of the invention, the motor 51 has been shown to provide an input to the actuator 39 as shown in FIG. 3B. Alternatively, the motor 51 may be replaced by one or more motors 613 shown in solid lines, (and in an alternative) in dashed lines in FIG. 12. Motors 613 rotate about an axis that is transverse to the axis of the motor 51 which they replace. That is, the motors 613 extend out of the side of the actuator 39. Otherwise, the actuator 39 is generally similar to that shown and described above. While a single motor 613 may be provided, two motors 613 advantageously provide redundancy and have the advantage of reducing stress on each of the motors 613.

The motors 613 may have a common shaft that engages and rotates an input worm gear inside or drivingly connects to the inside of the actuator. Alternatively, motors 613 may be implemented with separate shafts that have respective gears that engage a drive train within the housing 57. The drive train may advantageously include a worm gear. Additionally or alternatively, the drive train may include a planetary gear configuration that is capable of a gear reduction of approximately eighteen to one.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, dual shock absorbers or springs may advantageously be placed on outsides of the actuator arms for increased shock absorber or spring strength. In this configuration the upper control arm would be pivotally connected to the actuator arms at a location between the actuator arms.

The invention claimed is:

1. A vehicle suspension, comprising:
a lower arm having an inboard end and an outboard end;
an upper control arm having an inboard end and an outboard end, the upper control arm pivotally connected to the lower arm;
an actuator comprising an actuation mechanism and at least one actuator arm;
the actuator arm pivotally connected to the upper control arm;
the actuator is motively connected to the upper control arm by the actuator arm;
a cammed cylinder in fluid communication with the actuation mechanism that at least partially controls the actuator arm; and
the actuation mechanism connected to the actuator arm, wherein the actuation mechanism includes a mechanical shock absorber and an actuator line connects the cammed cylinder to the mechanical shock absorber.

2. The vehicle suspension of claim 1,
further comprising the mechanical shock absorber pivotally connected to the actuator arm.

3. The vehicle suspension of claim 2, further comprising:
a cam member supported on the lower arm;
the cammed cylinder having a piston motively coupled to the cam member; and
the actuator line connecting the cammed cylinder to the mechanical shock absorber.

4. The vehicle suspension of claim 1, further comprising a mechanical link pivotally connected to the actuator arm.

5. The vehicle suspension of claim 1, further comprising a hub assembly pivotally connected to the outboard ends of the lower arm and the upper control arm, wherein pivotal connections of the actuator arm, the lower arm, the upper control arm, and the hub assembly generally form a parallelogram.

6. The vehicle suspension of claim 1, further comprising:
an actuator pump coupled to the actuator line;
wherein:
the cammed cylinder has a piston motively coupled to the actuator line;
one of the cammed cylinder and the piston is supported on one of the lower arm and the upper control arm; and
the other of the piston and the cammed cylinder is motively connected to the actuator arm.

7. A frame and suspension for a vehicle, comprising:
a frame;
a lower arm having an inboard end coupled to the frame and an outboard end;
an upper control arm having an inboard end and an outboard end, the upper control arm pivotally connected to the lower arm;
an actuator comprising an actuation mechanism and at least one actuator arm;
the actuator arm pivotally connected to the upper control arm;
the actuation mechanism connected to the actuator arm;
a cammed cylinder having a piston in fluid communication with the actuation mechanism that at least partially controls the actuator arm; and
the actuator motively connected to the upper control arm by the actuator arm.

8. The frame and suspension for a vehicle of claim 7, wherein the actuation mechanism comprises a mechanical shock absorber and an actuator line that connects the cammed cylinder to the mechanical shock absorber.

9. The frame and suspension for a vehicle of claim 7, further comprising a mechanical shock absorber pivotally connected to the actuator arm.

10. The frame and suspension for a vehicle of claim 9, wherein the mechanical shock absorber is pivotally connected to the frame.

11. The frame and suspension for a vehicle of claim 9, further comprising:
   a cam member supported on the lower arm;
   the cammed cylinder having a piston motively coupled to the cam member; and
   an actuator line connecting the cammed cylinder to the mechanical shock absorber.

12. The frame and suspension for a vehicle of claim 11, wherein the cammed cylinder is supported on the frame.

13. The frame and suspension for a vehicle of claim 7, further comprising a mechanical link pivotally connected to the actuator arm.

14. The frame and suspension for a vehicle of claim 13, wherein the mechanical link is pivotally connected to the frame.

15. The frame and suspension for a vehicle of claim 7, further comprising a hub assembly pivotally connected to the outboard ends of the lower arm and the upper control arm, wherein pivotal connections of the actuator arm, the lower arm, the upper control arm, and the hub assembly generally form a parallelogram.

16. The frame and suspension for a vehicle of claim 15, further comprising a mechanical link pivotally connected to each of the actuator arm and the frame, wherein the parallelogram is a first parallelogram and pivotal connections between the mechanical link, the frame, the actuator arm, and the lower arm form a second parallelogram.

17. The frame and suspension for a vehicle of claim 7, further comprising:
   an actuator pump coupled to an actuator feed line;
   wherein:
      the actuator comprises the cammed cylinder having the piston motively coupled to the actuator feed line;
      one of the cammed cylinder and the piston is supported on one of the lower arm and the upper control arm; and
      the other of the piston and the cammed cylinder is motively connected to the actuator arm.

18. The frame and suspension for a vehicle of claim 7, wherein:
   the frame is a vehicle frame;
   the suspension comprises the lower arm, the upper control arm, the actuator arm, and the actuator as a first arm assembly; and
   wherein the suspension further comprises at least a second arm assembly comprising a second lower arm, a second upper control arm, a second actuator arm, and a second actuator.

19. The frame and suspension for a vehicle of claim 18, wherein each arm assembly includes a cammed cylinder fluidly connected to at least one mechanical shock absorber.

20. The frame and suspension for a vehicle of claim 19, wherein the cammed cylinders have pistons that move therein to provide a greater or lesser volume of a fluid for each shock absorber, the volume varying with an expansion or contraction of the fluid.

21. The frame and suspension for a vehicle of claim 20, wherein the volume is decreased as the respective arm assembly is rotated through an arc toward the frame.

22. The frame and suspension for a vehicle of claim 20, wherein the volume is decreased as the respective arm assembly is rotated through an arc away from the frame.

* * * * *